United States Patent
Heo et al.

(10) Patent No.: US 10,841,574 B2
(45) Date of Patent: Nov. 17, 2020

(54) IMAGE DECODING METHOD AND DEVICE USING INTRA PREDICTION IN IMAGE CODING SYSTEM

(71) Applicant: LG ELECTRONICS INC., Seoul (KR)

(72) Inventors: Jin Heo, Seoul (KR); Bumshik Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 103 days.

(21) Appl. No.: 16/096,194

(22) PCT Filed: Feb. 8, 2017

(86) PCT No.: PCT/KR2017/001350
§ 371 (c)(1),
(2) Date: Oct. 24, 2018

(87) PCT Pub. No.: WO2017/188565
PCT Pub. Date: Nov. 2, 2017

(65) Prior Publication Data
US 2019/0141317 A1    May 9, 2019

Related U.S. Application Data

(60) Provisional application No. 62/326,845, filed on Apr. 25, 2016.

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/119* (2014.11); *H04N 19/129* (2014.11);
(Continued)

(58) Field of Classification Search
None
See application file for complete search history.

(56) References Cited

U.S. PATENT DOCUMENTS

| 8,867,626 B2 * | 10/2014 | Takahashi | H04N 19/593 |
| | | | 375/240.27 |
| 2010/0128995 A1 * | 5/2010 | Drugeon | H04N 19/176 |
| | | | 382/238 |

(Continued)

FOREIGN PATENT DOCUMENTS

| JP | 2015109695 A | 6/2015 |
| KR | 10-2014-0008503 A | 1/2014 |

(Continued)

OTHER PUBLICATIONS

English Translation of KR 10-2014-008503 provided by KIPRIS.*

*Primary Examiner* — Jayanti K Patel
*Assistant Examiner* — Stefan Gadomski
(74) *Attorney, Agent, or Firm* — Dentons US LLP

(57) ABSTRACT

An image decoding method performed by a decoding device according to the present invention comprises the steps of: deriving an intra prediction mode for a current PU on the basis of a received bit stream; and performing reconstruction of a plurality of TUs located in an area of the current PU on the basis of the intra prediction mode, wherein the step of performing reconstruction comprises, with respect to a current block that is one of the plurality of TUs, a step of deriving a prediction sample of the current block on the basis of a first reference sample located in a prediction direction of the intra prediction mode and a second reference sample located in an opposite direction of the prediction direction, and a step of reconstructing a block to be reconstructed on the basis of the prediction sample.

13 Claims, 14 Drawing Sheets

(51) Int. Cl.
*H04N 19/593* (2014.01)
*H04N 19/119* (2014.01)
*H04N 19/182* (2014.01)
*H04N 19/129* (2014.01)
*H04N 19/91* (2014.01)

(52) U.S. Cl.
CPC ......... *H04N 19/176* (2014.11); *H04N 19/182* (2014.11); *H04N 19/593* (2014.11); *H04N 19/91* (2014.11)

(56) References Cited

U.S. PATENT DOCUMENTS

| | | | | |
|---|---|---|---|---|
| 2010/0322309 | A1* | 12/2010 | Huang | H04N 19/157 375/240.12 |
| 2011/0280304 | A1* | 11/2011 | Jeon | H04N 19/105 375/240.12 |
| 2011/0293001 | A1* | 12/2011 | Lim | H04N 19/50 375/240.12 |
| 2012/0082216 | A1* | 4/2012 | Wang | H04N 19/46 375/240.08 |
| 2012/0163455 | A1* | 6/2012 | Zheng | H04N 19/176 375/240.13 |
| 2012/0183041 | A1* | 7/2012 | Maani | H04N 19/176 375/240.02 |
| 2013/0022127 | A1* | 1/2013 | Park | H04N 7/26872 375/240.16 |
| 2013/0101036 | A1* | 4/2013 | Zhou | H04N 19/176 375/240.12 |
| 2013/0136175 | A1* | 5/2013 | Wang | H04N 19/176 375/240.12 |
| 2013/0251036 | A1* | 9/2013 | Lee | H04N 19/593 375/240.12 |
| 2013/0279569 | A1* | 10/2013 | Gao | H04N 19/91 375/240.03 |
| 2013/0279583 | A1* | 10/2013 | Gao | H04N 19/176 375/240.15 |
| 2013/0301709 | A1* | 11/2013 | Lim | H04N 19/105 375/240.03 |
| 2013/0301720 | A1* | 11/2013 | Lee | H04N 19/157 375/240.12 |
| 2014/0064360 | A1* | 3/2014 | Rapaka | H04N 19/105 375/240.02 |
| 2014/0133565 | A1* | 5/2014 | Lee | H04N 19/82 375/240.14 |
| 2014/0185672 | A1 | 7/2014 | Terada et al. | |
| 2014/0286411 | A1* | 9/2014 | Jeong | H04N 19/593 375/240.12 |
| 2015/0016516 | A1* | 1/2015 | Saxena | H04N 19/182 375/240.12 |
| 2015/0023405 | A1* | 1/2015 | Joshi | H04N 19/176 375/240.02 |
| 2015/0146781 | A1* | 5/2015 | Kwon | H04N 19/50 375/240.12 |
| 2015/0288980 | A1* | 10/2015 | Lee | H04N 19/593 375/240.16 |
| 2015/0350640 | A1* | 12/2015 | Jeong | H04N 19/105 375/240.12 |
| 2016/0205408 | A1* | 7/2016 | Shibata | H04N 19/436 375/240.13 |
| 2016/0249050 | A1* | 8/2016 | Shibata | H04N 19/176 |
| 2016/0301941 | A1* | 10/2016 | Chono | H04N 19/194 |
| 2016/0330464 | A1* | 11/2016 | Shimofure | H04N 19/157 |
| 2017/0150186 | A1* | 5/2017 | Zhang | H04N 19/82 |

FOREIGN PATENT DOCUMENTS

| | | | | |
|---|---|---|---|---|
| KR | 10-2014-0049098 A | 4/2014 | | |
| KR | 10-1540528 B1 | 7/2015 | | |
| WO | WO-2012011779 A2 * | 1/2012 | ........... | H04N 19/117 |

* cited by examiner

IMAGE DECODING METHOD AND DEVICE USING INTRA PREDICTION IN IMAGE CODING SYSTEM

CROSS-REFERENCE TO RELATED APPLICATIONS

This application is the National Stage filing under 35 U.S.C. 371 of International Application No. PCT/KR2017/001350, filed on Feb. 8, 2017, which claims the benefit of U.S. Provisional Application No. 62/326,845 filed on Apr. 25, 2016, the contents of which are all hereby incorporated by reference herein in their entirety.

BACKGROUND OF THE INVENTION

Field of the Invention

The present invention relates to an image coding technique and, more particularly, to an image coding method and an image coding device in an image coding system.

Related Art

Demand for high-resolution and high-quality images, such as HD (High Definition) images and UHD (Ultra High Definition) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY OF THE INVENTION

An aspect of the present invention is to provide a method and a device for increasing image coding efficiency.

Another aspect of the present invention is to provide a method and a device for intra-prediction method and device which are implemented based on first neighboring samples and second neighboring samples of a current block.

Still another aspect of the present invention is to provide a method and a device for determining the reconstruction order of a plurality of TUs in the area of a current PU based on an intra-prediction mode for the current PU.

Yet another aspect of the present invention is to provide a method and a device for deriving non-square TUs from a current CU.

According to one embodiment of the present invention, there is provided a video decoding method performed by a decoding device. The method includes: deriving an intra-prediction mode for a current prediction unit (PU) based on a received bitstream; and reconstructing a plurality of transform units (TUs) positioned in an area of the current PU based on the intra-prediction mode, wherein the reconstructing includes: deriving first neighboring samples including left neighboring samples, an upper-left neighboring sample, and right neighboring samples of a current block, which is one of the plurality of TUs; deriving second neighboring samples including right neighboring samples, a lower-right neighboring samples, and lower neighboring samples of the current block based on the first neighboring samples; deriving a prediction sample of the current block based on a first reference sample positioned in a prediction direction of the intra-prediction mode among the first neighboring samples and the second neighboring samples and a second reference sample positioned in an opposite direction of the prediction direction; and reconstructing the current block based on the prediction sample.

According to another embodiment of the present invention, there is provided a decoding device performing video decoding. The decoding device includes: an entropy decoder to receive information on an intra-prediction mode for a current prediction unit (PU) through a bitstream; and a predictor to derive the intra-prediction mode for the current P based on the intra-prediction mode information and to reconstruct a plurality of transform units (TUs) positioned in an area of the current PU based on the received bitstream, wherein the predictor derives first neighboring samples including left neighboring samples, an upper-left neighboring sample, and right neighboring samples of a current block, which is one of the plurality of TUs, derives second neighboring samples including right neighboring samples, a lower-right neighboring samples, and lower neighboring samples of the current block based on the first neighboring samples, derives a prediction sample of the current block based on a first reference sample positioned in a prediction direction of the intra-prediction mode among the first neighboring samples and the second neighboring samples and a second reference sample positioned in an opposite direction of the prediction direction, and reconstructs the current block based on the prediction sample.

According to still another embodiment of the present invention, there is provided a video encoding method performed by an encoding device. The method includes: deriving an intra-prediction mode for a current PU; reconstructing a plurality of TUs positioned in an area of the current PU based on the intra-prediction mode; and encoding and outputting information on the intra-prediction mode for the current PU and residual information on the current block, wherein the reconstructing includes: deriving first neighboring samples including left neighboring samples, an upper-left neighboring sample, and right neighboring samples of a current block, which is one of the plurality of TUs; deriving second neighboring samples including right neighboring samples, a lower-right neighboring samples, and lower neighboring samples of the current block based on the first neighboring samples; deriving a prediction sample of the current block based on a first reference sample positioned in a prediction direction of the intra-prediction mode among the first neighboring samples and the second neighboring samples and a second reference sample positioned in an opposite direction of the prediction direction; and reconstructing the current block based on the prediction sample.

According to yet another embodiment of the present invention, there is provided a video encoding device. The encoding device includes: a predictor to derive an intra-prediction mode for a current PU and to reconstruct a plurality of TUs positioned in an area of the current PU based on the intra-prediction mode; and an entropy encoder to encode and output information on the intra-prediction mode for the current PU and residual information on the current block, wherein the predictor derives first neighboring samples including left neighboring samples, an upper-left neighboring sample, and right neighboring samples of a current block, which is one of the plurality of TUs, derives second neighboring samples including right neighboring samples, a lower-right neighboring samples, and lower neighboring samples of the current block based on the first neighboring samples, derives a prediction sample of the current block based on a first reference sample positioned in a prediction direction of the intra-prediction mode among the first neighboring samples and the second neighboring samples and a second reference sample positioned in an opposite direction of the prediction direction, and reconstructs the current block based on the prediction sample.

According to the present invention, intra-prediction may be performed based on first neighboring samples and second neighboring samples of a current block, thereby improving the accuracy of intra-prediction on the current block.

Further, according to the present invention, the reconstruction order of a plurality of TUs positioned in the area of a current PU may be changed based on an intra-prediction mode for the current PU, thereby improving the accuracy of intra-prediction on the current block.

Also, according to the present invention, non-square TUs may be derived from a current CU, thereby improving the accuracy of intra-prediction on the current block.

BRIEF DESCRIPTION OF THE DRAWINGS

FIG. 6 illustrates an example of the changed reconstruction order of a plurality of TUs determined according to which category of a plurality of categories an intra-prediction mode belongs to.

DESCRIPTION OF EXEMPLARY EMBODIMENTS

Figure 1:
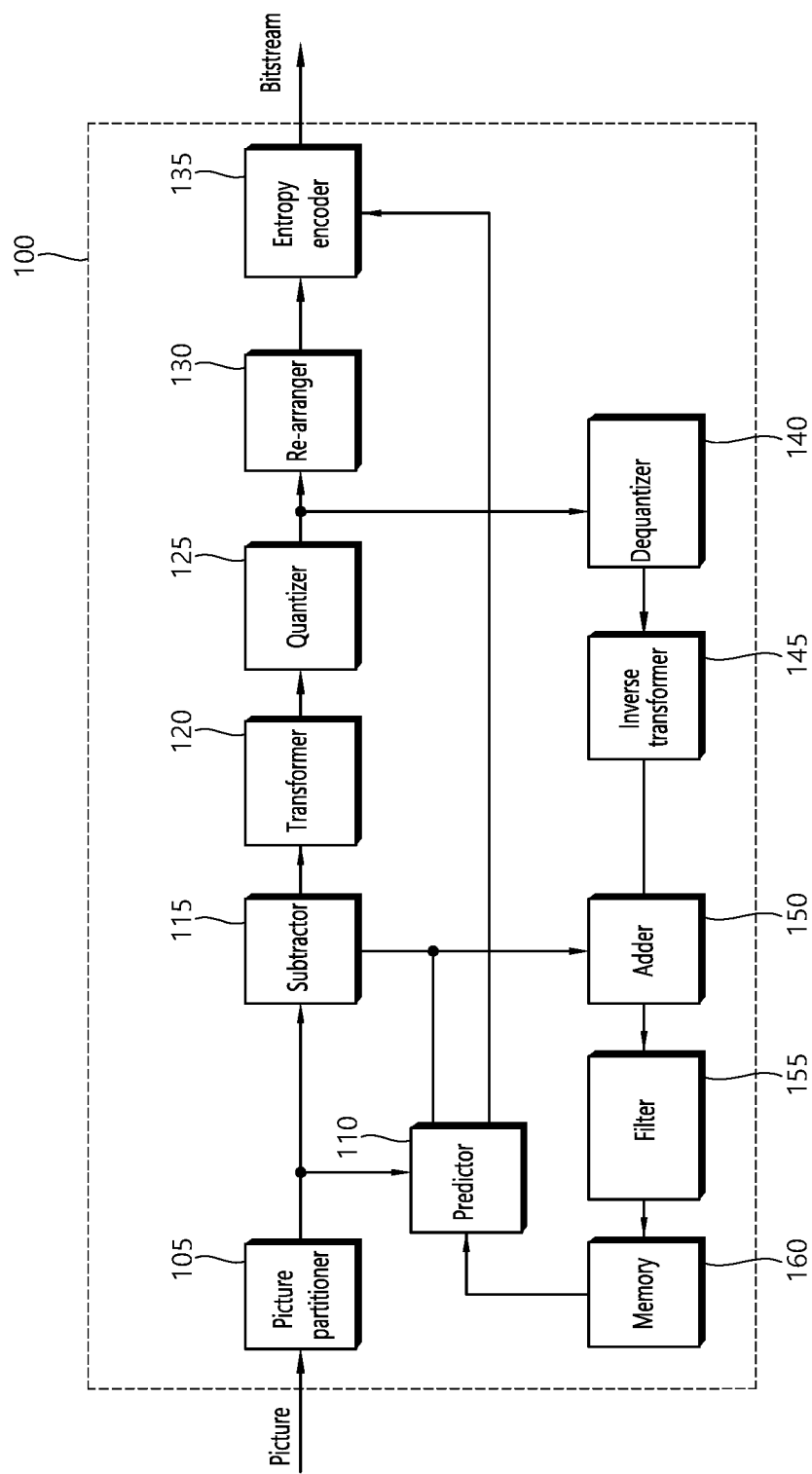
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, a picture generally means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a 'sample' may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present invention is applicable.

Referring to FIG. 1, a video encoding device 100 includes a picture partitioner 105, a predictor 110, a subtractor 115, a transformer 120, a quantizer 125, a re-arranger 130, an entropy encoder 135, a dequantizer 140, an inverse transformer 145, an adder 150, a filter 255, and a memory 160.

The picture partitioner 105 may split an input picture into at least one processing unit. Here, a processing unit may be a coding unit (CU), a prediction unit (PU) or a transform unit (TU). The coding unit is a unit block of coding, and a coding tree unit (CTU) or a largest coding unit (LCU) may be split into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit on the basis of coding efficiency according to video characteristics. When a smallest coding unit (SCU) is set, a coding unit cannot be split into a coding unit smaller than the smallest coding unit. Here, the final coding unit refers to a coding unit partitioned or split into a prediction unit or a transform unit. A prediction unit is a block partitioned from a coding unit block and may be a unit block of sample prediction. Here, the prediction unit may be divided into sub blocks. A transform block can be split from a coding unit block according to the quad-tree structure and may be a unit block that derives a transform coefficient and/or a unit block that derives a residual signal from a transform coefficient.

Hereinafter, the coding unit may be called a coding block (CB), the prediction unit may be called a prediction block (PB), and the transform unit may be called a transform block (TB).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 110 may perform prediction on a processing target block (hereinafter, a current block), and may generate a prediction block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block on the basis of a reference sample outside the current block in a picture to which the current block belongs (hereinafter, a current picture). In this case, the predictor 110 may derive the prediction sample on the basis of an average or interpolation of neighboring reference samples of the current block (case (i)), or may derive the prediction sample on the basis of a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block on the basis of a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned on the basis of a picture order count (POC) difference between a current picture and a corresponding reference picture. A POC corresponds to a display order and can be discriminated from a coding order.

The subtractor 115 generates a residual sample which is a difference between an original sample and a prediction sample. If the skip mode is applied, the residual sample may not be generated as described above.

The transformer 120 transforms residual samples in units of a transform block to generate a transform coefficient. The transformer 120 may perform transformation on the basis of the size of a corresponding transform block and a prediction mode applied to a coding block or prediction block spatially overlapping with the transform block. For example, residual samples can be transformed using discrete sine transform (DST) if intra-prediction is applied to the coding block or the prediction block overlapping with the transform block and the transform block is a 4×4 residual array and is transformed using discrete cosine transform (DCT) in other cases.

The quantizer 125 may quantize the transform coefficients to generate a quantized transform coefficient.

The re-arranger 130 rearranges quantized transform coefficient. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 140 dequantizes values (transform coefficients) quantized by the quantizer 125 and the inverse transformer 145 inversely transforms values dequantized by the dequantizer 135 to generate a residual sample.

The adder 150 adds a residual sample to a prediction sample to reconstruct a picture. The residual sample may be added to the prediction sample in units of a block to generate a reconstructed block. Although the adder 150 is described as a separate component, the adder 150 may be a part of the predictor 110.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture or information necessary for encoding/decoding. The DPB may store the reconstructed picture. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
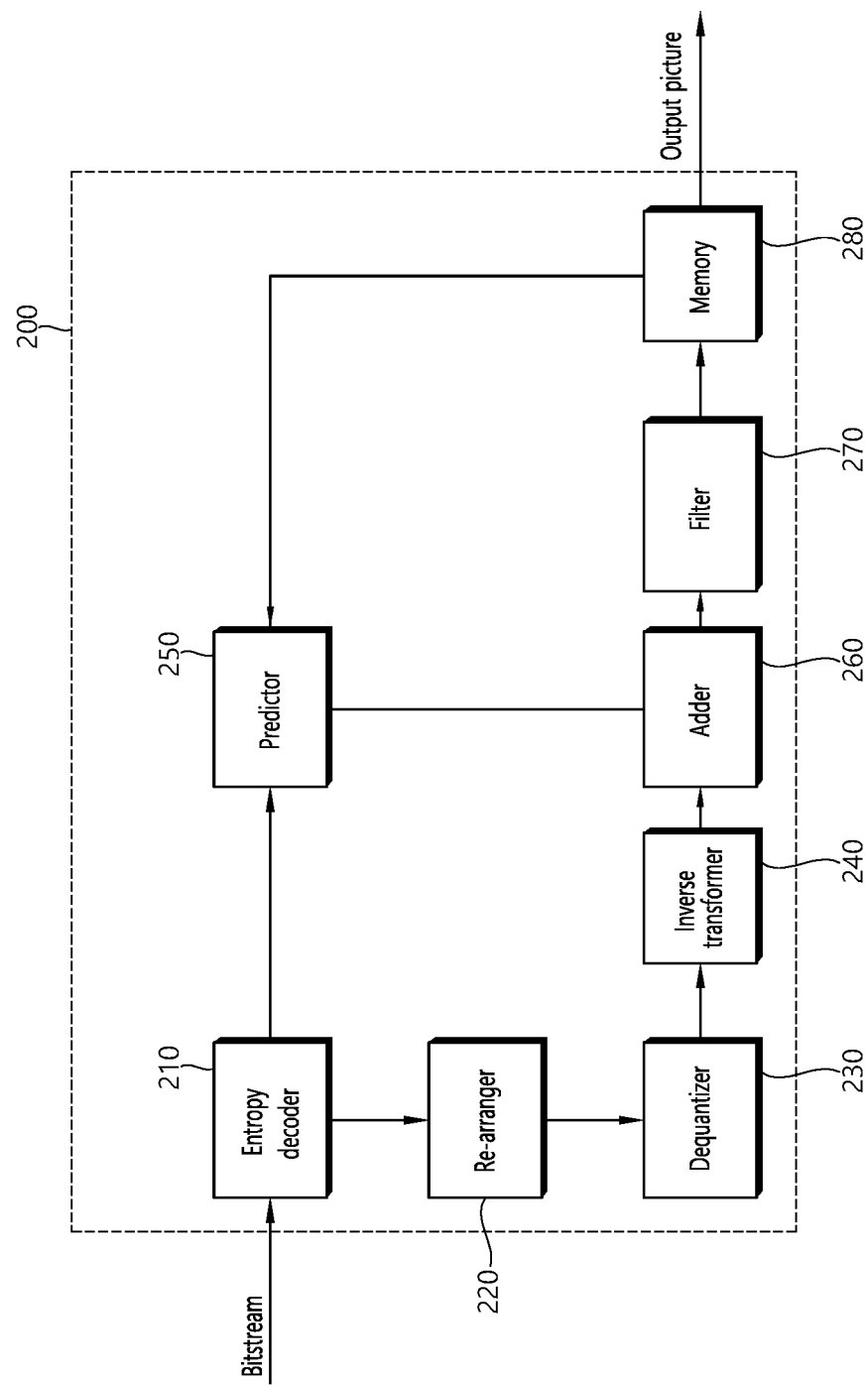
FIG. 2 is a schematic diagram illustrating a configuration of a video decoding device to which the present invention is applicable.

FIG. 2 briefly illustrates a structure of a video decoding device to which the present invention is applicable.

Referring to FIG. 2, a video decoding device 200 includes an entropy decoder 210, a re-arranger 220, a dequantizer 230, an inverse transformer 240, a predictor 250, an adder 260, a filter 270, and a memory 280.

When a bitstream including video information is input, the video decoding device 200 may reconstruct a video in association with a process by which video information is processed in the video encoding device.

For example, the video decoding device 200 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 210 may parse the bitstream to output information required for video reconstruction or picture reconstruction. For example, the entropy decoder 210 may decode information in the bitstream on the basis of a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of a symbol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 220.

The re-arranger 220 may rearrange the quantized transform coefficients into a two-dimensional block form. The re-arranger 220 may perform rearrangement corresponding to coefficient scanning performed by the encoding device. Although the re-arranger 220 is described as a separate component, the re-arranger 220 may be a part of the quantizer 230.

The dequantizer 230 may de-quantize the quantized transform coefficients on the basis of a (de)quantization parameter to output a transform coefficient. In this case, information for deriving a quantization parameter may be signaled from the encoding device.

The inverse transformer 240 may inverse-transform the transform coefficients to derive residual samples.

The predictor 250 may perform prediction on a current block, and may generate a prediction block including prediction samples for the current block. A unit of prediction performed in the predictor 250 may be a coding block or may be a transform block or may be a prediction block.

The predictor 250 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 250 may derive a prediction sample for a current block on the basis of a neighboring reference sample in a current picture. The predictor 250 may derive the prediction sample for the current block by applying a directional mode or a non-directional mode on the basis of the neighboring reference sample of the current block. In this case, a prediction mode to be applied to the current block may be determined by using an intra-prediction mode of a neighboring block.

In the case of inter-prediction, the predictor 250 may derive a prediction sample for a current block on the basis of a sample specified in a reference picture according to a motion vector. The predictor 250 may derive the prediction sample for the current block using one of the skip mode, the merge mode and the MVP mode. Here, motion information required for inter-prediction of the current block provided by the video encoding device, for example, a motion vector and information about a reference picture index may be acquired or derived on the basis of the information about prediction.

In the skip mode and the merge mode, motion information of a neighboring block may be used as motion information of the current block. Here, the neighboring block may include a spatial neighboring block and a temporal neighboring block.

The predictor 250 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 250 may derive the motion vector of the current block using the merge index.

When the MVP (Motion Vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 250 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 250 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 260 can add a residual sample to a prediction sample to reconstruct a current block or a current picture. The adder 260 may reconstruct the current picture by adding the residual sample to the prediction sample in units of a block. When the skip mode is applied, a residual is not transmitted and thus the prediction sample may become a reconstructed sample. Although the adder 260 is described as a separate component, the adder 260 may be a part of the predictor 250.

The filter 270 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 280 may store a reconstructed picture or information necessary for decoding. Here, the reconstructed picture may be the reconstructed picture filtered by the filter 270. For example, the memory 280 may store pictures used for inter-prediction. Here, the pictures used for inter-prediction may be designated according to a reference picture set or a reference picture list. A reconstructed picture may be used as a reference picture for other pictures. The memory 280 may output reconstructed pictures in an output order.

As described above, when intra-prediction is performed on a current block, a coding device may derive a prediction sample for the current block by applying one of 33 directional intra-prediction modes and two non-directional intra-prediction modes and may reconstruct the current block based on the prediction sample. Hereinafter, reconstructing a block or a unit may include generating a reconstruction sample (s) in the block or the unit. When a directional intra-prediction mode is applied to the current block, a prediction sample may be generated using a reference sample according to the intra-prediction mode among neighboring samples for the current block in order to perform intra-prediction on the current block. Here, the neighboring samples may include left, upper-left, and upper neighboring samples of the current block. Further, since the directional intra-prediction generates a prediction sample by simply copying a reference sample positioned in one prediction direction, the longer the distance between the prediction sample and the reference sample is, the lower the accuracy of prediction is, thus increasing an error.

In order to reduce the error, the coding device may derive right neighboring samples, a lower-right neighboring sample, and lower neighboring samples of the current block and may generate a prediction sample based on the derived neighboring samples and the existing neighboring samples (left neighboring samples, upper-left neighboring sample, and upper neighboring samples). That is, the coding device may derive a neighboring sample positioned in the prediction direction of the intra-prediction mode as a first reference sample and a neighboring sample positioned in the opposite direction of the prediction direction as a second reference sample and may generate a prediction sample for the current block based on the first reference sample and the second reference sample. For example, the prediction sample may be generated through interpolation using the first reference sample and the second reference sample. Using this method, it is possible to improve the accuracy of intra-prediction while minimizing the transmission of additional auxiliary information, thereby improving overall coding efficiency. Here, the left neighboring samples, the upper-left neighboring sample, and the upper neighboring samples of the current block may be referred to as first neighboring samples, and the right neighboring samples, the lower-right neighboring sample, and the lower neighboring samples of the current block may be referred to as second neighboring samples. In addition, the foregoing prediction method may be referred to as linear interpolation prediction or linear interpolation intra-prediction.

Figure 3:
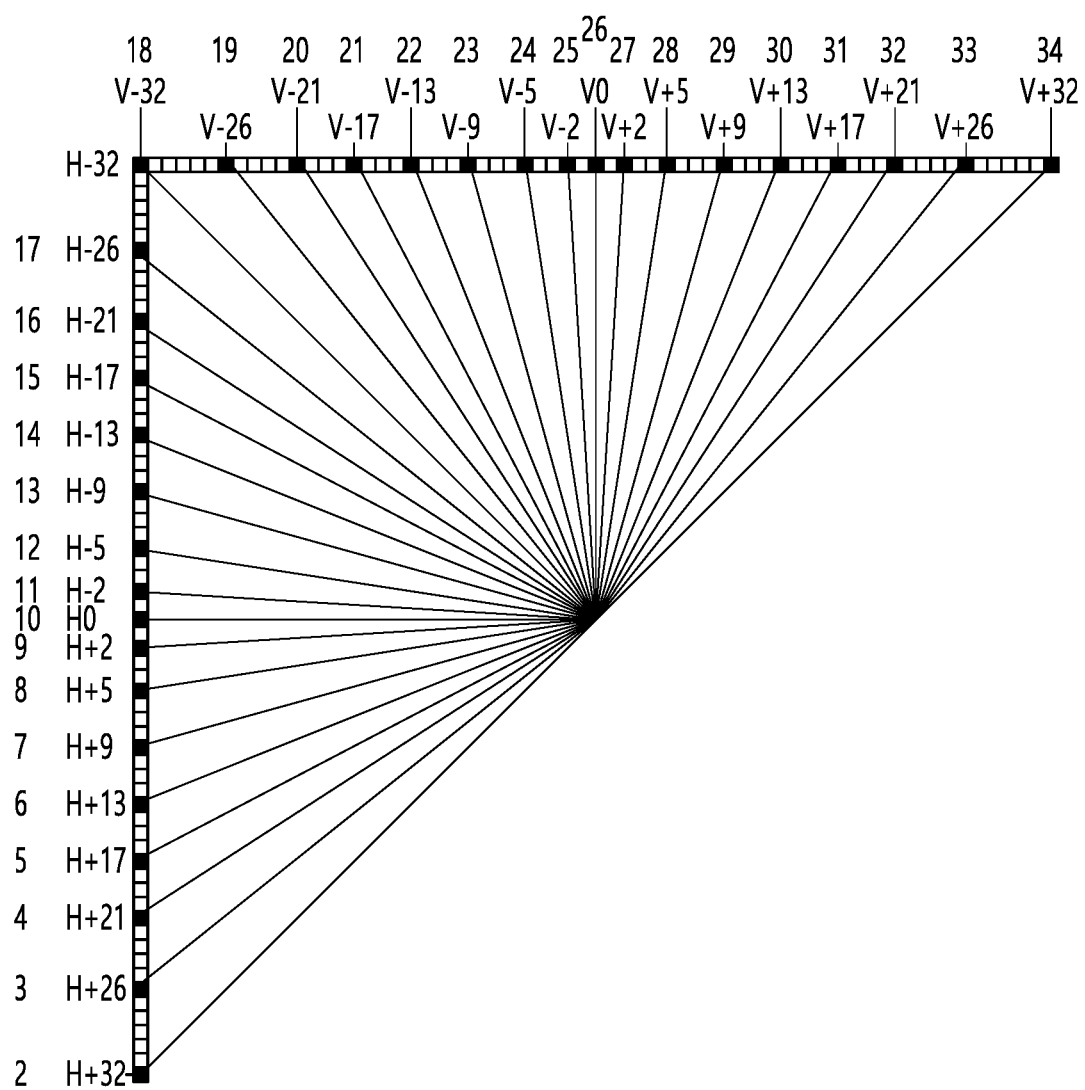
FIG. 3 illustrates an example of a prediction direction of an intra-prediction mode.

FIG. 3 illustrates an example of a prediction direction of an intra-prediction mode. Referring to FIG. 3, intra-prediction modes according to the present invention may include, for example, two non-directional intra-prediction modes and 33 directional intra-prediction modes. Here, intra-prediction modes 0 and 1 are the non-directional intra-prediction modes, wherein intra-prediction mode 0 indicates an intra planar mode, and intra-prediction mode 1 indicates an intra DC mode. The remaining intra-prediction modes 2 to 34 are the directional intra-prediction modes, each of which has a prediction direction as shown in FIG. 3. The directional intra-prediction modes may be referred to as intra-angular modes. A predicted sample value of a current sample of a current block may be derived based on an intra-prediction mode for the current block.

For example, when the intra-prediction mode for the current block is one of the directional intra modes, a value of a neighboring sample positioned in the prediction direction of the intra-prediction mode for the current block based on the current sample in the current block may be derived as the predicted sample value of the current sample. When there is no neighboring sample in an integer sample unit in the prediction direction based on the current sample, a sample in a fraction sample unit positioned in the prediction direction may be derived based on interpolation on neighboring samples in an integer sample unit positioned in the prediction direction, thereby deriving a value of the sample in the fraction sample unit as the predicted sample value of the current sample.

In order to perform the intra-prediction according to the present invention, a first reference sample and a second reference sample need to be derived, and thus first neighboring samples and second neighboring samples need to be derived. That is, the coding device may generate right neighboring samples, a lower-right neighboring sample, and lower neighboring samples of the current block and may perform the intra-prediction according to the present invention on the current block based on various neighboring samples adjacent to the current block. The coding device may derive, based on the current sample, a neighboring sample positioned in the prediction direction of the intra-prediction mode as the first reference sample and a neighboring sample positioned in the opposite direction of the prediction direction as the second reference sample and may generate a prediction sample for the current block based on the first reference sample and the second reference sample.

For example, the coding device may derive the first reference sample and the second reference sample for the prediction sample for the current block and may generate the prediction sample through interpolation using the first reference sample and the second reference sample.

For example, the coding device may derive the prediction sample for the current block using the following equation.

$$predSample = (d1*predSample0 + d0 \, predSample1 + ((d1+d0)>>1))/(d1+d0) \quad [\text{Equation 1}]$$

Here, predSample denotes the prediction sample, predSample0 denotes the first reference sample, predSample1 denotes the second reference sample, d0 denotes the first distance between the prediction sample and the first reference sample, and d1 denotes the second distance between the prediction sample and the second reference sample. The first distance and the second distance may be derived based on the following table.

TABLE 1 iIdx0 = (intraPredAngle*y0) >> 5
iFact0 = (intraPredAngle*y0) & 31
predSample0 = ( 32 − iFact0 ) * refAbove[x + iIdx0 + 1] + iFact0 * refAbove[x + iIdx0 + 2]

TABLE 1-continued iIdx1 = (intraPredAngle*y1) >> 5
iFact1 = (intraPredAngle*y1) & 31
predSample1 = ( 32 − iFact1 ) * refBelow[x − iIdx1 + 1] + iFact1 * refBelow[x − iIdx1]
d0 = $\sqrt{(iIdx0 <<5 +iFact0)^2 +(y0 <<5)^2}$
d1 = $\sqrt{(iIdx1 <<5 +iFact1)^2 +(y1 <<5)^2}$ Here, d0 denotes the first distance, d1 denotes the second distance, intraPredAngle denotes the intra-prediction angle of the intra-prediction mode, refAbove[m] denotes the first reference sample, which is one of the upper neighboring samples and has an x coordinate of m, and refBelow[n] denotes the second reference sample, which is one of the lower neighboring samples and has an x coordinate of n. Table 1 shows that the upper neighboring sample having an x coordinate of m is derived as the first reference sample and the lower neighboring sample having an x coordinate of n is derived as the second reference sample, which is for illustration only. Instead, a left reference sample and a right reference sample may be used depending on the prediction direction of a directional intra mode.

When the intra-prediction mode is the directional intra-prediction mode, the intra-prediction angle according to the directional intra-prediction mode may be derived based on the following table.

TABLE 2

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | — | 32 | 26 | 21 | 17 | 13 | 9 | 5 | 2 | 0 | −2 | −5 | −9 | −13 | −17 | −21 | −26 |
| predModeIntra | 18 | 19 | 20 | 21 | 22 | 23 | 24 | 25 | 26 | 27 | 28 | 29 | 30 | 31 | 32 | 33 | 34 |
| intraPredAngle | −32 | −26 | −21 | −17 | −13 | −9 | −5 | −2 | 0 | 2 | 5 | 9 | 13 | 17 | 21 | 26 | 32 |

Here, predModeIntra denotes an index indicating an intra-prediction mode, and intraPredAngle denotes the intra-prediction angle of the intra-prediction mode.

The current block may be one of a plurality of transform units (TUs) included in the area of a current prediction unit (PU), in which case the plurality of TUs may be predicted and reconstructed according to a specific order.

Figure 4:
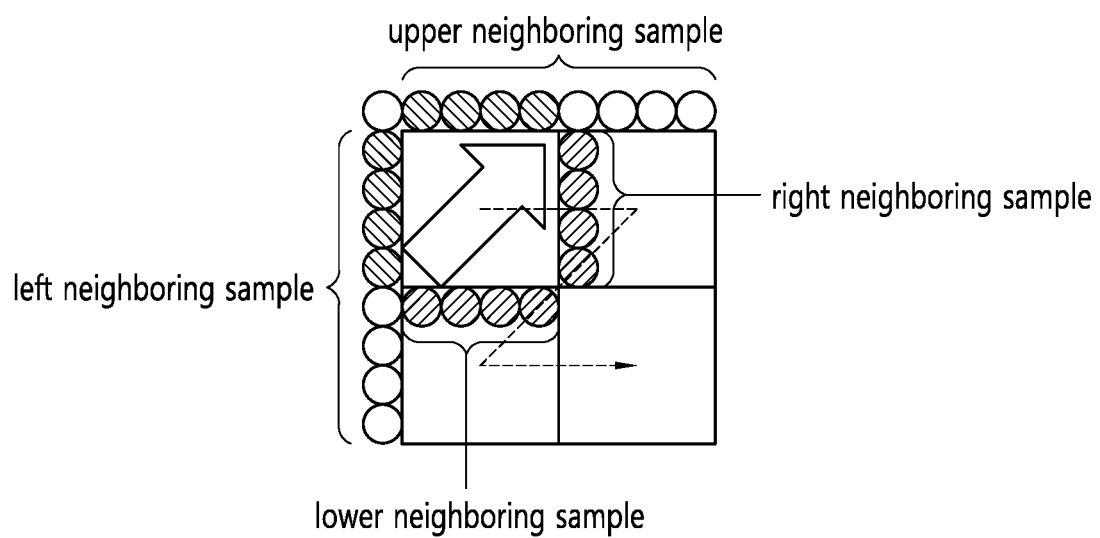
FIG. 4 illustrates an example in which intra-prediction according to the present invention is performed on a plurality of TUs in a raster scan order.

FIG. 4 illustrates an example in which intra-prediction according to the present invention is performed on a plurality of TUs in a raster scan order. A current block may be one of the plurality of TUs. Referring to FIG. 4, the reconstruction order (or transform order or decoding order) of the plurality of TUs positioned in the area of a current PU may be based on the raster scan order. Specifically, the plurality of TUs may be sequentially reconstructed in order from an upper row to a lower row and may be sequentially reconstructed in order from a left TU to a right TU in each row. The raster scan order may be referred to as a Z scan order. As shown in FIG. 4, the transformation and reconstruction of the plurality of TUs may be performed in a Z-shaped direction, and accordingly only first neighboring samples including upper neighboring samples, an upper-left neighboring sample, and left neighboring samples of the current block may be available when performing intra-prediction on the current block, which is one of the plurality of TUs. That is, a TU including right neighboring samples of the current block and a TU including lower neighboring samples of the current block may be decoded after the current block is decoded according to the decoding order and thus may not be used for decoding the current block. Accordingly, in order to increase efficiency in intra-prediction on the current block, second neighboring samples including the right neighboring samples, a lower-right neighboring sample, and the lower neighboring samples may be derived in addition to the first neighboring samples. For example, the second neighboring samples may be derived using already decoded (reconstructed) neighboring samples of the current block. In this case, efficiency in intra-prediction according to the present invention may be determined according to the accuracy of the derived second neighboring samples. However, since the second neighboring samples are practically not the reconstructed samples of a right block, a lower-right block, and a lower block but are samples estimated for the intra-prediction of the current block, the second neighboring samples may have low accuracy, which may affect efficiency in intra-prediction according to the present invention. Therefore, as the number of already decoded neighboring samples used for intra-prediction on the current block according to the present invention increases, efficiency in intra-prediction according to the present invention can be improved.

Among the neighboring samples, different neighboring samples may be practically used for generating a prediction sample according to an intra-prediction mode. In this case, according to the present invention, the number of already decoded neighboring samples to be used for intra-prediction may be increased by changing the reconstruction order of the TUs.

For example, a coding device may change the reconstruction order of the plurality of TUs positioned in the area of the current PU based on an intra-prediction mode (or the prediction direction of the intra-prediction mode) and may sequentially perform intra-prediction according to the present invention on the plurality of TUs positioned in the area of the current PU according to the changed reconstruction order. In this case, intra-prediction modes may be divided into a plurality of categories, and prediction, transformation, and reconstruction may be performed in specified order according to each category.

Figure 5:
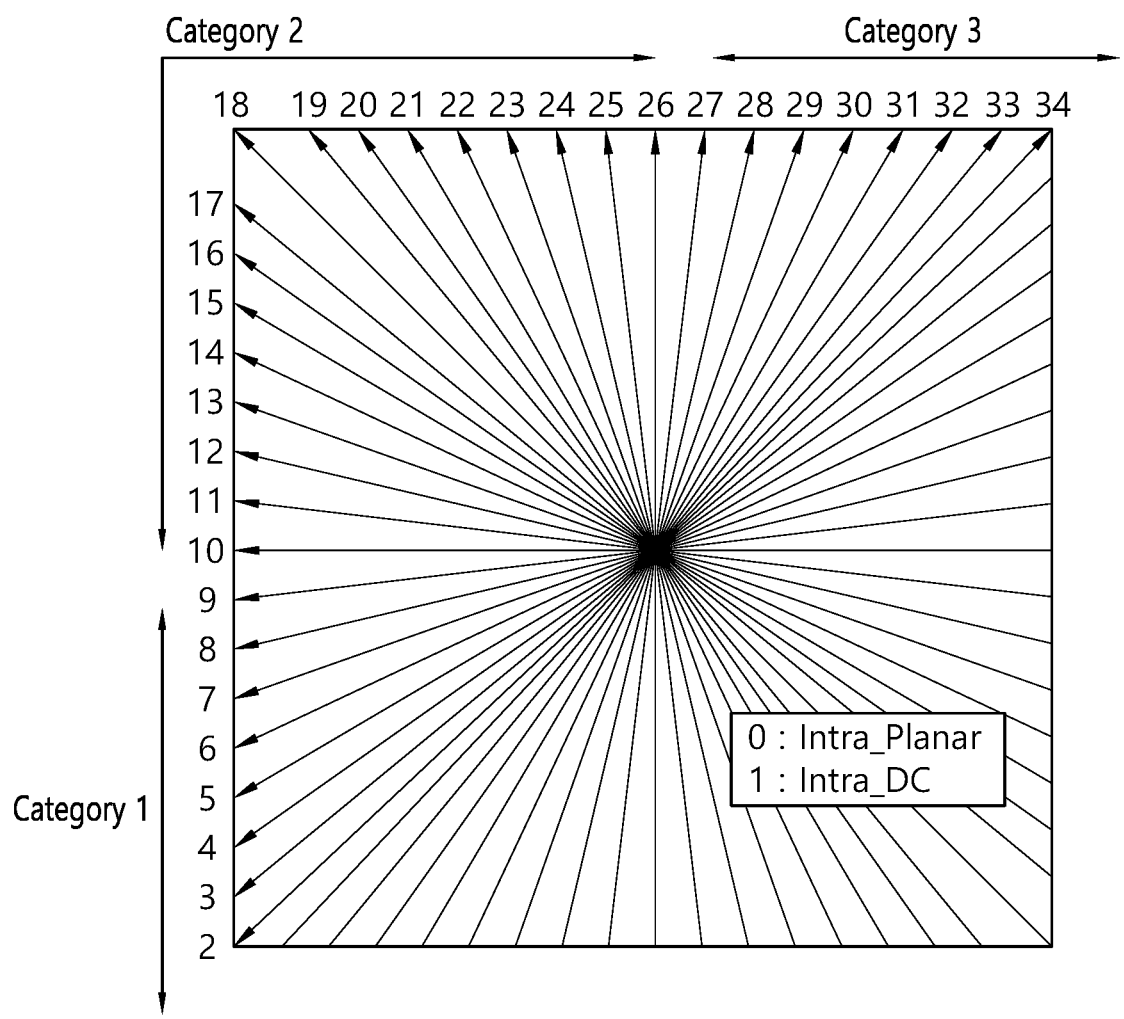
FIG. 5 illustrates an example in which directional intra-prediction modes are divided into a plurality of categories.

FIG. 5 illustrates an example in which directional intra-prediction modes are divided into a plurality of categories. As shown in FIG. 5, intra-prediction modes 2 to 9 may be classified as category 1, intra-prediction modes 10 to 26 may be classified as category 2, and intra-prediction modes 27 to 34 may be classified as category 3. Non-directional intra-prediction modes including intra-prediction modes 0 and 1 may not belong to the plurality of categories or may belong to category 2.

When reconstructing a plurality of TUs using a fixed direction (e.g., the Z-shaped direction (raster scan order)) regardless of the prediction direction of an intra-prediction mode for a current PU as in an existing prediction method, a coding device may use inaccurate neighboring samples as reference samples, thus generating inaccurate prediction samples. In the present invention, however, a reconstruction order (or transformation order or decoding order) may be changed in order to increase the number of available neighboring samples for decoding the plurality of TUs considering the prediction direction of the intra-prediction mode. That is, the coding device may sequentially perform intra-prediction according to the present invention on the plurality of TUs positioned in the area of the current PU sequentially according to the changed reconstruction order considering the prediction direction of the intra-prediction mode.

Figure 6:
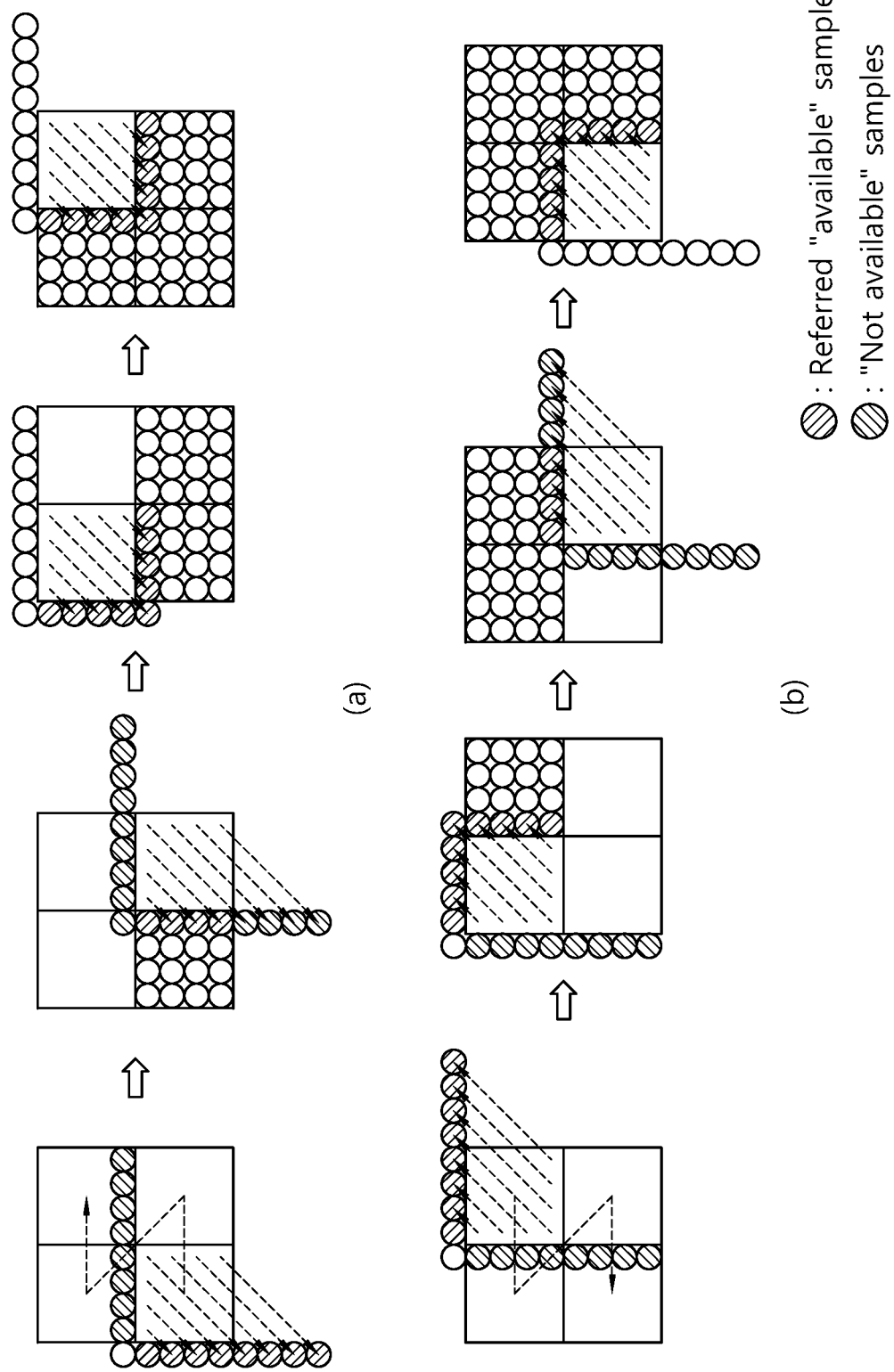

FIG. 6 illustrates an example of the changed reconstruction order of a plurality of TUs determined according to which category of a plurality of categories an intra-prediction mode belongs to. Referring to FIG. 6, it is possible to increase the number of neighboring samples available for decoding each TU by applying the changed reconstruction order according to the category to which the intra-prediction mode belongs, and to generate a more accurate prediction sample.

Referring to (a) of FIG. 6, when the intra-prediction mode belongs to category 1, a coding device may apply a changed reconstruction order to the plurality of TUs. Specifically, when an intra-prediction mode included in category 1 is applied, the plurality of TUs may be sequentially reconstructed in order from a lower row to an upper row and may be sequentially reconstructed in order from a left TU to a right TU in each row. This changed reconstruction order (or transformation order or decoding order) may be referred to as a horizontally inversed raster scan order.

Referring to (b) of FIG. 6, when the intra-prediction mode belongs to category 3, the coding device may apply a changed reconstruction order to the plurality of TUs. Specifically, when an intra-prediction mode included in category 3 is applied, the plurality of TUs may be sequentially reconstructed in order from an upper row to a lower row and may be sequentially reconstructed in order from a right TU to a left TU in each row. This changed reconstruction order (or transformation order or decoding order) may be referred to as a vertically inversed raster scan order.

When the intra-prediction mode belongs to category 2, the coding device may reconstruct the plurality of TUs according to the Z-shaped direction (raster scan order). Specifically, when an intra-prediction mode included in category 2 is applied, the plurality of TUs may be sequentially reconstructed in order from an upper row to a lower row and may be sequentially reconstructed in order from a left TU to a right TU in each row.

As described above, since intra-prediction according to the present invention generates a prediction sample of a current block based on all neighboring samples adjacent to the current block to be coded, the accuracy of the neighboring samples and the accuracy of the prediction sample may be proportional to each other. That is, when intra-prediction according to the present invention is performed by applying the changed reconstruction order according to the prediction direction of the intra-prediction mode of the current block shown in FIG. 6, the number of already decoded neighboring samples may be increased at the decoding time of the current block according to the changed reconstruction order, thus allowing the coding device to generate a more accurate prediction sample.

Figure 7:
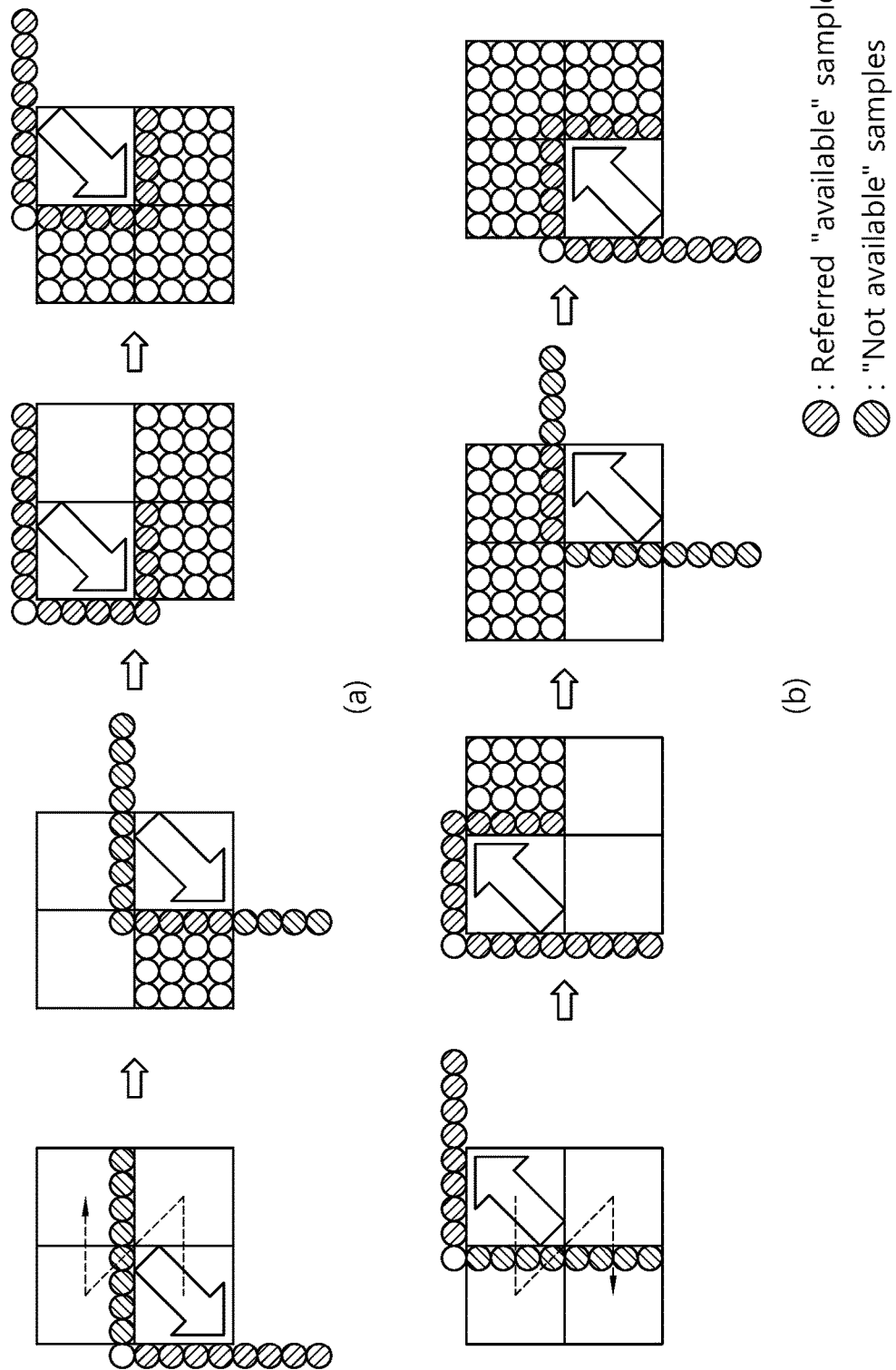
FIG. 7 illustrates an example of intra-prediction according to the present invention on a plurality of TUs performed in a changed reconstruction order according to the category to which an intra-prediction mode belongs.

FIG. 7 illustrates an example of intra-prediction according to the present invention on a plurality of TUs performed in a changed reconstruction order according to the category to which an intra-prediction mode belongs.

Referring to (a) of FIG. 7, when the intra-prediction mode belongs to category 1, a coding device may perform intra-prediction according to the present invention on the plurality of TUs in the horizontally inversed raster scan order. Specifically, when the intra-prediction mode belongs to category 1, the plurality of TUs may be sequentially reconstructed in order from a lower row to an upper row and may be sequentially reconstructed in order from a left TU to a right TU in each row. As shown in (a) of FIG. 7, the number of available neighboring samples that can be used for reference in the prediction of each TU according to the present invention may be increased, and thus the coding device may generate a more accurate prediction sample.

Referring to (b) of FIG. 7, when the intra-prediction mode belongs to category 1, a coding device may perform intra-prediction according to the present invention on the plurality of TUs in the vertically inversed raster scan order. Specifically, when the intra-prediction mode belongs to category 3, the plurality of TUs may be sequentially reconstructed in order from an upper row to a lower row and may be sequentially reconstructed in order from a right TU to a left TU in each row. As shown in (b) of FIG. 7, the number of available neighboring samples that can be used for reference in the intra-prediction of each TU according to the present invention may be increased, and thus the coding device may generate a more accurate prediction sample.

Among first neighboring samples and second neighboring samples used for performing intra-prediction according to the present invention, there may be samples that are unavailable at the decoding time of a current block, and these unavailable samples may be derived, for example, by the following method.

Figure 8:
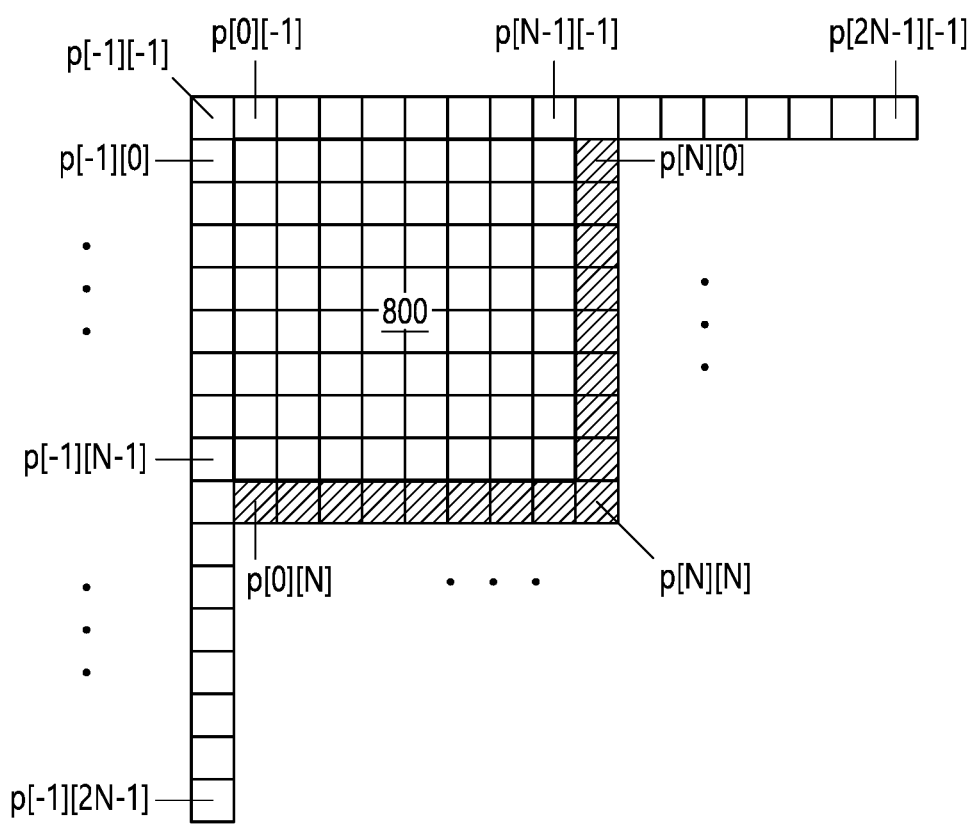
FIG. 8 illustrates first neighboring samples and second neighboring samples for intra-prediction according to the present invention.

FIG. 8 illustrates first neighboring samples and second neighboring samples for intra-prediction according to the present invention.

Referring to FIG. 8, not only first neighboring samples, which include left neighboring samples p[−1][2N−1], . . . , p[−1][0], an upper-left neighboring sample p[−1][−1], and upper neighboring samples p[0][−1], . . . , p[2N−1][−1], but also second neighboring samples, which include lower neighboring samples p[0][N], . . . , p[N−1][N], a lower-right neighboring sample p[N][N], and right neighboring samples p[N][N−1], . . . , p[N][0], may be derived as neighboring samples for intra-prediction on a current block 800 according to the present invention. Here, p[m] [n] represents a sample (or pixel) at a sample position (m, n) and may indicate a relative sample position when the position of a top-left sample of the current block is defined as (0, 0). Further, N represents the size of the current block 800. N may correspond to the width or the height of the current block 800. When the current block 800 is a TU, N may be represented as nTbS.

When there is an unavailable samples for intra-prediction among the first neighboring samples p[−1][2N−1], . . . , p[−1][−1], . . . , and p[2N−1][−1], the unavailable sample may be replaced with an available sample through a substitution or padding procedure. In this case, for example, the unavailable sample may be substituted or padded with another neighboring sample adjacent to the sample.

Here, for example, when a sample is positioned outside a picture, the sample may be an unavailable sample. For example, when the current block 800 is positioned at the edge of the picture, some of the neighboring samples may be unavailable.

In another example, when another TU including a sample is not yet reconstructed, the sample may be an unavailable sample.

The substitution or padding procedure may be performed, for example, in the following order.

1) When the neighboring sample p[−1][2N−1] is unavailable, a search is sequentially performed from the neighboring sample p[−1][2N−1] (or neighboring sample p[−1][2N−2]) to p[−1][−1] and then from p[0][−1] to p[2N−1][−1], and the value of an available neighboring sample first found is assigned to the neighboring sample p[−1][2N−1].

2) A search is sequentially performed from where x=−1 and y=2N−2 to where x=−1 and y=−1. When p[x][y] is unavailable, the value of p[x][y+1] replaces the value of unavailable p[x][y].

3) A search is sequentially performed from where x=0 and y=−1 to where x=2N−1 and y=−1. When p[x][y] is unavailable, the value of p[x−1][y] replaces the value of unavailable p[x] [y].

On the other hand, some or all of the second neighboring samples, which include the lower neighboring samples p[0][N], . . . , p[N−1][N], the lower-right neighboring sample p[N][N], and the right neighboring samples p[N][N−1], . . . , p[N][0], may be unavailable, in which case unavailable samples may be replaced with an available sample through a substitution or padding procedure.

For example, when all of the lower neighboring samples p[0] [N], . . . p[N−1][N], the lower-right neighboring sample p[N][N], and the right neighboring samples p[N][N−1], . . . , p[N] [0] are unavailable, a value derived through interpolation (or average) of a neighboring sample p[−1] [N] and a neighboring sample p[N][−1] or interpolation (or average) of a sample p[−1][2N−1] and a sample p[2N−1][−1] may be assigned to a sample p[N][N]. For example, the lower-right neighboring sample may be derived based on the following equation.

$$p[N][N]=(p[N][-1]+p[-1][N]+1)>>1 \qquad \text{[Equation 2]}$$

Here, p[N][N] denotes the lower-right neighboring sample, p[N][−1] denotes the neighboring sample p[N][−1], and p[−1][N] denotes the neighboring sample p[−1][N].

Further, for example, the lower-right neighboring sample may be derived based on the following equation.

$$p[N][N]=(p[2N-1][-1]+p[-1][2N-1]+1)>>1 \qquad \text{[Equation 3]}$$

Here, p[N][N] denotes the lower-right neighboring sample, p[2N−1][−1] denotes the neighboring sample p[2N−1][−1], and p[−1][2N−1] denotes the neighboring sample p[−1][2N−1].

Subsequently, the lower neighboring samples and the upper neighboring samples may be derived based on the lower-right neighboring sample and the first neighboring samples. For example, a value derived through interpolation of the lower-right neighboring sample p[N][N] and the neighboring sample p[−1][N] may be assigned for each of the lower neighboring samples p[0][N], p[N−1][N] depending on the position. Further, a value derived through interpolation of the lower-right neighboring sample p[N][N] and the neighboring sample p[N][−1] may be assigned for each of the right neighboring samples p[N][N−1], . . . , p[N][0] depending on the position.

In another example, when at least one of the lower neighboring samples p[0][N], p[N−1][N], the lower-right neighboring sample p[N][N], and the right neighboring samples p[N][N−1], . . . , p[N][0] is available, the substitution or padding procedure may be performed in the following order.

1) When the neighboring sample p[0][N] unavailable, a search is sequentially performed from the neighboring sample p[0][N] (or neighboring sample p[1][N]) to p[N][N] and then from p[N][N−1] to p[N][0], and the value of an available neighboring sample first found is assigned to the neighboring sample p[0][N].

2) A search is sequentially performed from where x=1 and y=N to where x=N and y=N. When p[x][y] is unavailable, the value of p[x−1][y] replaces the value of unavailable P[x][y].

3) A search is sequentially performed from where x=N and y=N−1 to where x=N and y=0. When p[x][y] is unavailable, the value of p[x][y+1] replaces the value of unavailable p[x][y]. Alternatively, a search is sequentially performed from where x=N and y=0 to where x=N and y=N−1. When p[x][y] is unavailable, the value of p[x][y−1] may replace the value of unavailable p[x][y].

In order to improve the accuracy of intra-prediction according to the present invention, a plurality of TUs may be derived not only as square TUs but also as non-square TUs and may be subjected to intra-prediction according to the present invention. That is, the plurality of TUs may be derived from a current CU and may be derived as square or non-square TUs. Intra-prediction according to the present invention on the non-square TUs may be performed, for example, by the following method. On the other hand, one TU may be positioned in one PU area, or a plurality of TUs may be positioned in one PU area. That is, one or more PUs and a plurality of TUs may be derived from the current CU in various forms. For example, one PU may be derived from the current CU, and a plurality of TUs may be located in the area of the PU. Also, for example, a plurality of PUs and a plurality of TUs may be derived from the current CU, and each of the plurality of PUs may be positioned with the same size in the same area as each of the plurality of TUs.

Figure 9:
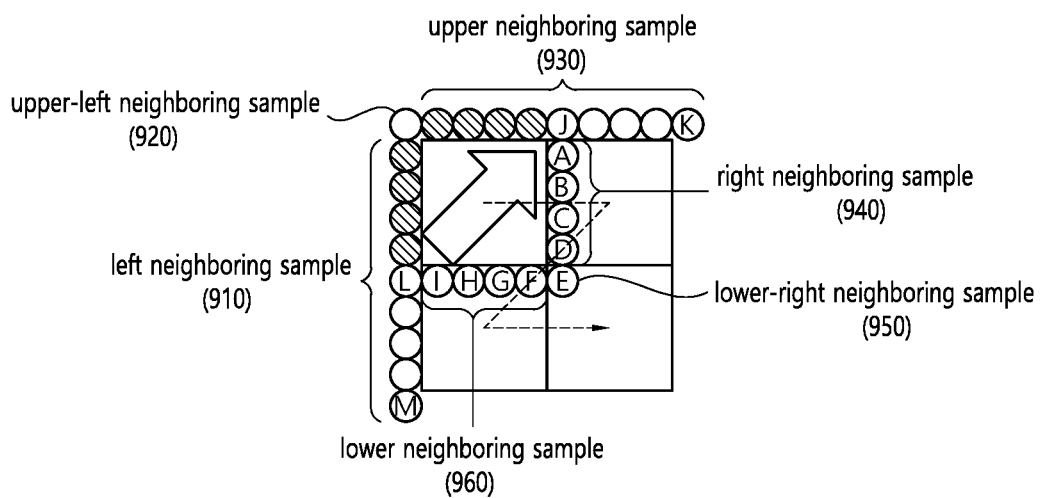
FIG. 9 illustrates an example of a reference sample generated to perform intra-prediction according to the present invention on a square TU.

FIG. 9 illustrates an example of a reference sample generated to perform intra-prediction according to the present invention on a square TU. Referring to FIG. 9, a coding device may generate second neighboring samples including lower neighboring samples 960, a lower-right neighboring sample 950, and right neighboring samples 940 of a current block in order to perform intra-prediction according to the present invention on a square TU. That is, the coding device may derive first neighboring samples including left neighboring samples 910, an upper-left neighboring sample 920, and upper neighboring samples 930 of the current block and may derive the second neighboring samples including the lower neighboring samples 960, the lower-right neighboring sample 950, and the right neighboring samples 940 on the basis of the first neighboring samples. Specifically, for example, the coding device may first generate the lower-right neighboring sample 950 based on the first neighboring samples and may generated the lower neighboring samples 960 and the right neighboring samples 940 based on the lower-right neighboring sample 950. For example, as described above, a value derived through interpolation (or average) of a neighboring sample p[−1][N] and a neighboring sample p[N][−1] or interpolation (or average) of a neighboring sample p[−1][2N−1] and a neighboring sample p[2N−1][−1] may be assigned to the lower-right neighboring sample p[N][N]. Next, a value derived through interpolation of the neighboring samples p[N][N] and the neighboring sample p[−1][N] may be assigned for each of the lower neighboring samples p[0][N], . . . , p[N−1][N] depending on the position. Further, a value derived through interpolation of the neighboring samples p[N][N] and the neighboring sample p[N][−1] may be assigned for each of the right neighboring samples p[N][N−1], . . . , p[N][0] depending on the position. Here, p[m][n] represents a sample (or pixel) at a sample position (m, n) and may indicate a relative sample position when the position of a top-left sample of the current block is defined as (0, 0). Further, N may correspond to the width or the height of the current block.

Since the distance from the lower-right neighboring sample 950 to the neighboring sample p[−1][N] and to the neighboring sample p[N][−1] or the distance from the lower-right neighboring sample 950 to the neighboring sample p[−1][2N−1] and the neighboring sample p[2N−1][−1] is relatively longer in the square TU than in a non-square TU, there is a possibility that the sample value of the lower-right neighboring sample is inaccurate. Further, the derived sample values of the right neighboring samples 940 and the lower neighboring samples 960 derived based on the lower-right neighboring sample 950 may also be inaccurate compared to those in a case where the current block is a non-square TU. In order to solve these problems, the coding device may derive a plurality of TUs as non-square TUs from a current CU and may perform intra-prediction according to the present invention on the non-square TUs. In this case, the non-square TUs may be derived considering an intra-prediction mode.

Figure 10:
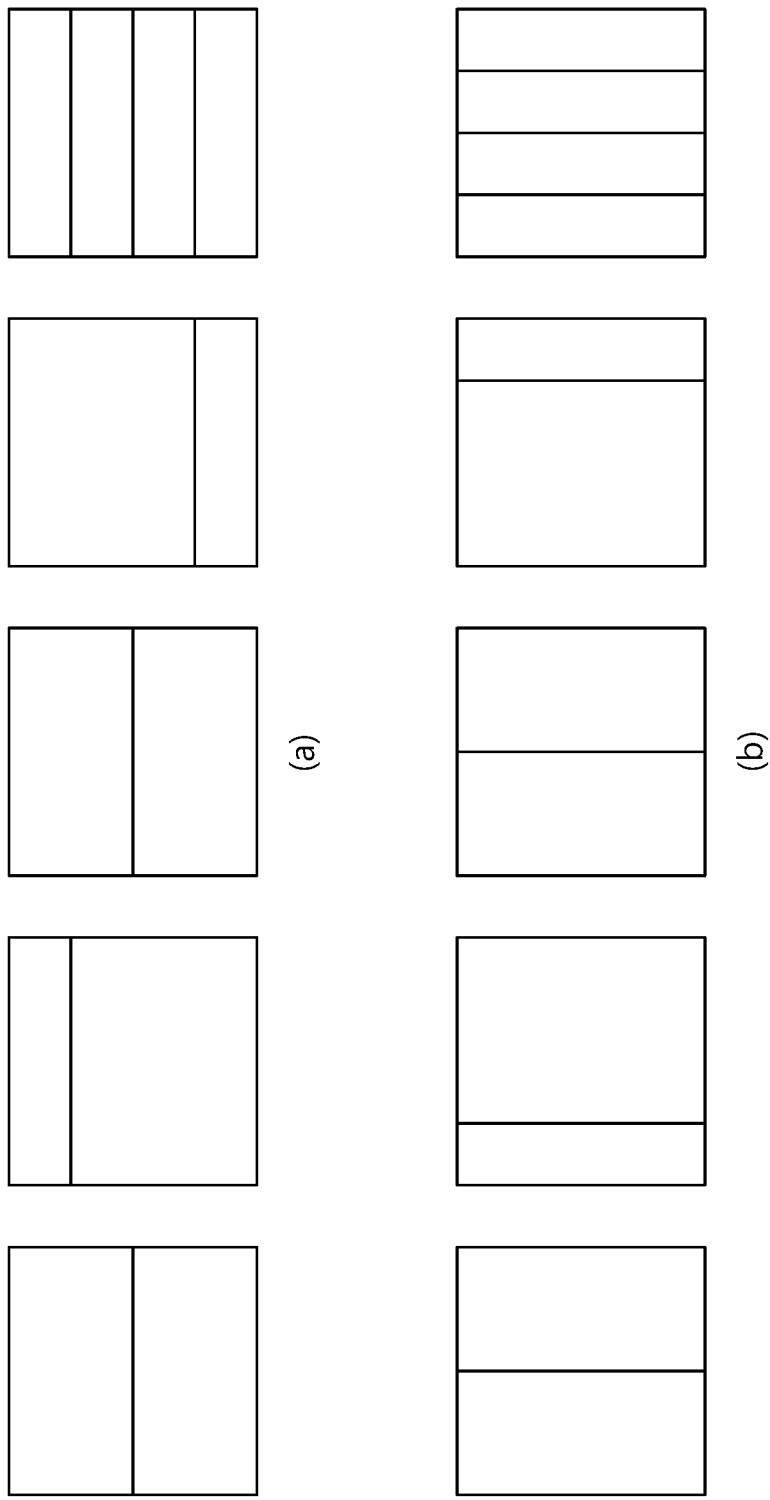
FIG. 10 illustrates an example of a plurality of non-square TUs derived from a current CU considering an intra-prediction mode.

FIG. 10 illustrates an example of a plurality of non-square TUs derived from a current CU considering an intra-prediction mode.

Referring to (a) of FIG. 10, when an intra-prediction mode for a current PU is one of intra-prediction modes 18 to 34, the plurality of TUs may be derived as non-square TUs having a width longer than a height. Intra-prediction modes 18 to 34 may be referred to as vertical-wise modes, and a non-square TU having a width longer than a height may be referred to as a horizontal non-square TU. Specifically, for example, when the current CU has a size of 2N×2N, the plurality of TUs may be derived as 2N×N non-square TUs. Also, the plurality of TUs may be derived as 2N×nU or 2N×nD non-square TUs. Further, the plurality of TUs may be derived as 2N×nN non-square TUs.

Referring to (b) of FIG. 10, when the intra-prediction mode for the current PU is one of intra-prediction modes 2 to 17, the plurality of TUs may be derived as non-square TUs having a height longer than a width. Intra-prediction modes 2 to 17 may be referred to as horizontal-wise modes, and a non-square TU having a height longer than a width may be referred to as a vertical non-square TU. Specifically, for example, when the current CU has a size of 2N×2N, the plurality of TUs may be derived as N×2N non-square TUs. Further, the plurality of TUs may be derived as nL×2N or nR×2N non-square TUs. Also, the plurality of TUs may be derived as nN×2N non-square TUs.

When performing intra-prediction according to the present invention on the current block that is a non-square TU, the distance from a lower-right neighboring sample to a neighboring sample p[−1][N] and to a neighboring sample p[N][−1] or the distance from the lower-right neighboring sample to a neighboring sample p[−1][2N−1] and a neighboring sample p[2N−1][−1] may be shorter than when performing intra-prediction according to the present invention on a square TU, and thus the more accurate sample value of the lower-right neighboring sample may be derived. Therefore, it is possible to improve the accuracy of the sample values of the right neighboring samples and the lower neighboring samples, which are derived based on the lower-right neighboring sample, compared to the case of performing intra-prediction according to the present invention on a square TU, thus improving the prediction accuracy of the current block. When a plurality of non-square TUs is derived from the current CU based on the intra-prediction mode, intra-prediction according to the present invention on the plurality of non-square TUs may be performed as follows.

Figure 11:
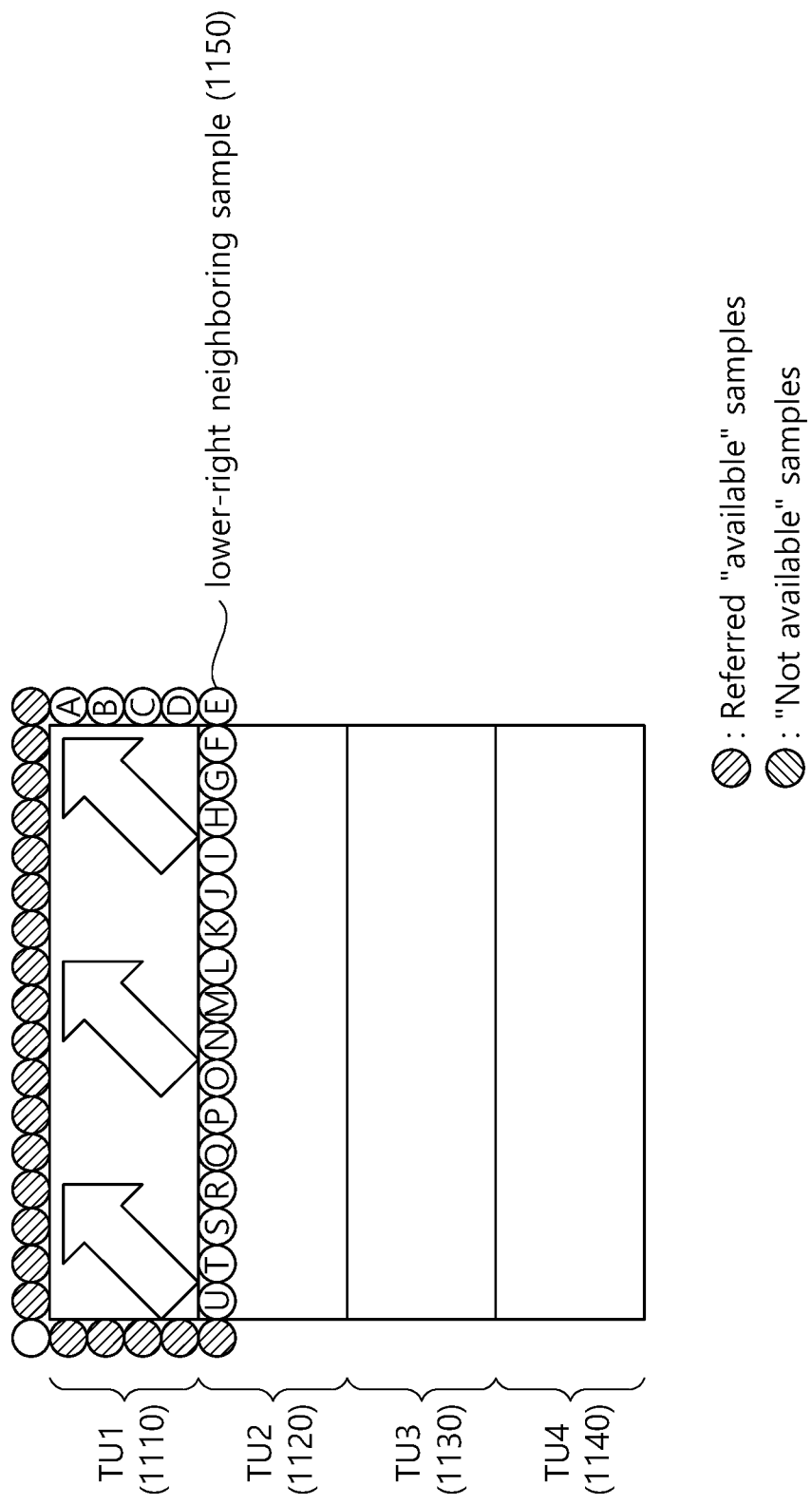
FIG. 11 illustrates an example of intra-prediction according to the present invention on a horizontally long non-square TU.

FIG. 11 illustrates an example of intra-prediction according to the present invention on a horizontally long non-square TU.

Referring to FIG. 11, when an intra-prediction mode for a current PU is one of the vertical-wise modes (intra-prediction modes 18 to 34) and a current CU has a size of 2N×2N, a coding device may derive four 2N×N/2 non-square TUs from the current TU. As shown in FIG. 11, the non-square TUs may include TU1 1110, TU2 1120, TU3 1130, and TU4 1140. When performing intra-prediction according to the present invention on TU1 1110, the coding device may derive a lower-right neighboring sample 1150 of TU1 1110 based on first neighboring samples including left neighboring samples, an upper-left neighboring sample, and upper neighboring samples of TU1 1110. After deriving the lower-right neighboring sample 1150, the coding device may derive right neighboring samples of TU1 1110 based on the first neighboring samples and the lower-right neighboring sample 1150 and may derive lower neighboring samples of TU1 1110 based on the first neighboring samples and the lower-right neighboring sample 1150. That is, the coding device may derive second neighboring samples including the lower neighboring samples, the lower-right neighboring sample 1150, and the right neighboring samples based on the first neighboring samples and the lower-right neighboring sample 1150. The coding device may perform intra-prediction according to the present invention based on the first neighboring samples and the second neighboring samples of TU1 1110, thereby deriving a prediction sample of TU1 1110. In this case, the encoding device may generate a residual signal based on the derived prediction sample and may encode the residual signal by performing transformation, quantization, and entropy encoding. In addition, the encoding device may perform dequantization and inverse transformation on the residual signal of TU1 1110 to generate a reconstruction block corresponding to TU1 1110 and may perform intra-prediction according to the present invention on TU2 1120 based on the reconstruction block.

Figure 12:
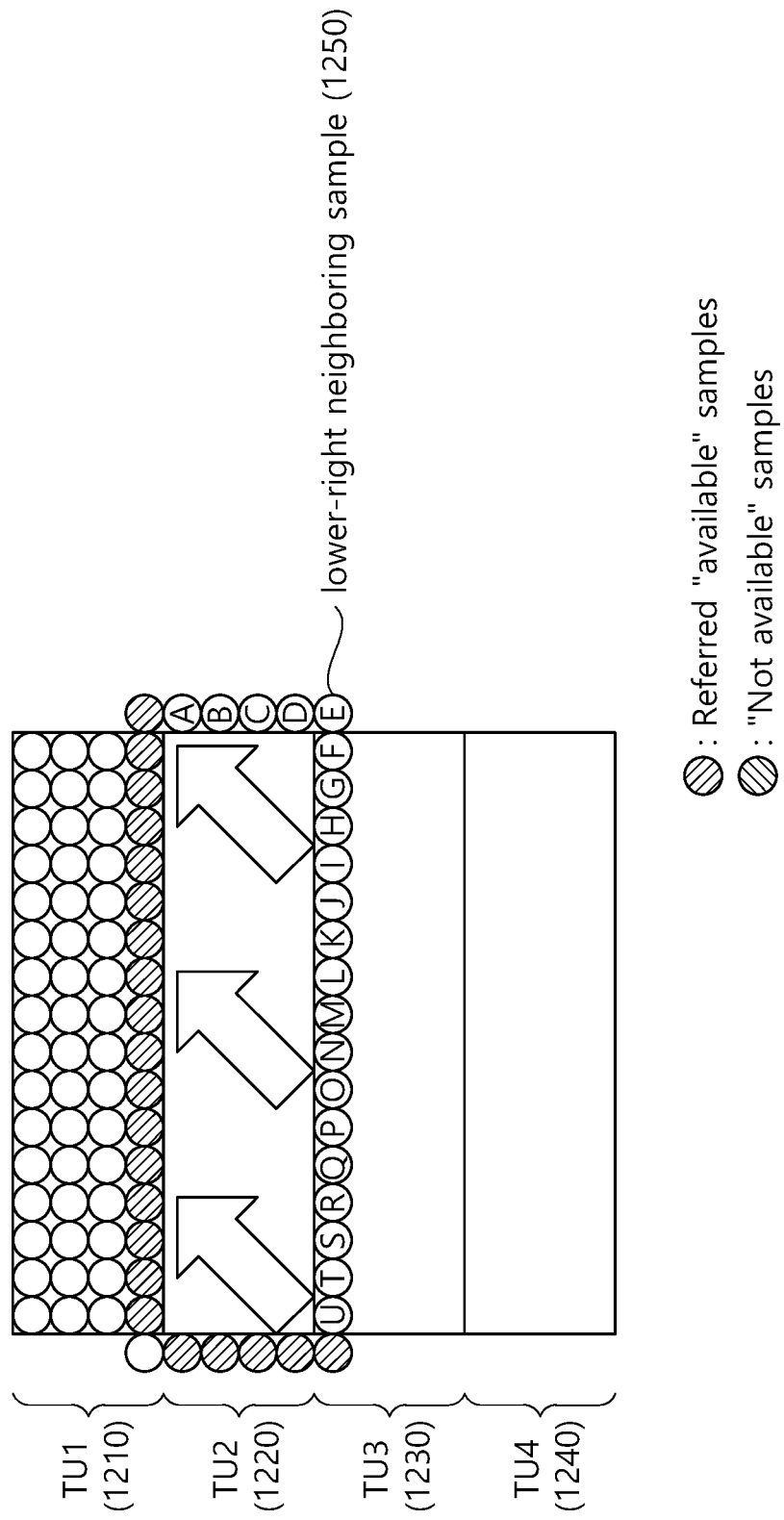
FIG. 12 illustrates another example of intra-prediction according to the present invention on a horizontally long non-square TU.

FIG. 12 illustrates another example of intra-prediction according to the present invention on a horizontally long non-square TU. This example shows that intra-prediction according to the present invention is performed on TU2 after TU1 is encoded/decoded (or reconstructed).

As shown in FIG. 12, non-square TUs may include TU1 1210, TU2 1220, TU3 1230, and TU4 1240. When performing intra-prediction according to the present invention on TU2 1220, a coding device may derive a lower-right neighboring sample 1250 of TU2 1220 based on first neighboring samples of TU2 including left neighboring samples, an upper-left neighboring sample, and upper neighboring samples of TU2 1220. The first neighboring samples may include reconstruction samples of TU1 1210 already decoded at the decoding time of TU2 1220. After deriving the lower-right neighboring sample 1250, the coding device may derive right neighboring samples of TU2 1220 based on the first neighboring samples and the lower-right neighboring sample 1250 and may derive lower neighboring samples of TU2 1220 based on the first neighboring samples and the lower-right neighboring sample 1250. That is, the coding device may derive second neighboring samples including the lower neighboring samples, the lower-right neighboring sample 1250, and the right neighboring samples based on the first neighboring samples and the lower-right neighboring sample 1250. The coding device may perform intra-prediction according to the present invention based on the first neighboring samples and the second neighboring samples of TU2 1220, thereby deriving a prediction sample of TU2 1220.

The methods shown in FIGS. 11 and 12 may be applied in a similar manner to intra-prediction according to the present invention on a vertically long non-square TU, thereby improving the prediction accuracy of the current block.

Figure 13:
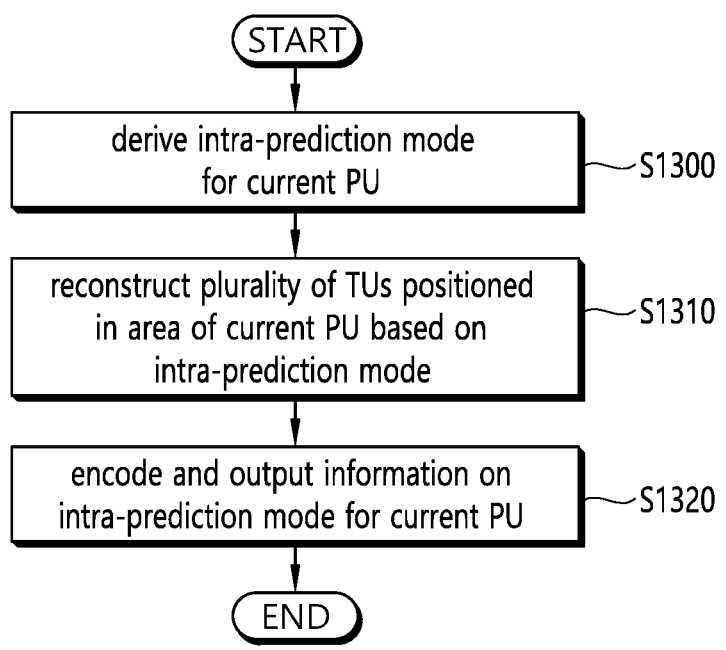
FIG. 13 schematically illustrates a video encoding method by an encoding device according to the present invention.

FIG. 13 schematically illustrates a video encoding method by an encoding device according to the present invention. The method illustrated in FIG. 13 may be performed by the encoding device illustrated in FIG. 1. Specifically, for example, S1300 and S1310 in FIG. 13 may be performed by the predictor of the encoding device, and S1320 may be performed by the entropy encoder of the encoding device.

The encoding device derives an intra-prediction mode for a current PU (S1300). The encoding device may perform various intra-prediction modes to derive an intra-prediction mode having optimal RD cost as the intra-prediction mode for the current PU. The intra-prediction mode may be one of two non-directional prediction modes and 33 directional prediction modes. As described above, the two non-directional prediction modes may include an intra DC mode and an intra planar mode.

A current block may be one of a plurality of TUs positioned in the area of the current PU, and the intra-prediction mode for the current PU may be derived as an intra-prediction mode for the current block.

The encoding device reconstructs the plurality of TUs positioned in the area of the current PU based on the intra-prediction mode (S1310). The encoding device may perform intra-prediction on each of the plurality of TUs to generate a prediction sample and may reconstruct each TU based on the prediction sample.

For example, the encoding device may derive first neighboring samples including left neighboring samples, an upper-left neighboring sample, and right neighboring samples of the current block, which is one of the plurality of TUs. The first neighboring samples may be samples already reconstructed at the decoding time of the current block.

When there is an unavailable sample among the first neighboring samples ($p[-1][2N-1], \ldots, p[-1][-1], p[2N-1][-1]$), the unavailable sample may be replaced with an available sample through a substitution or padding procedure. In this case, for example, the unavailable sample may be substituted or padded with another neighboring sample adjacent to the sample. When the current block has a size of N×N and the position of a top-left sample of the current block has an x component of 0 and a y component of 0, the left neighboring samples may be $p[-1][2N-1]$ to $p[-1][0]$, the upper-left neighboring sample may be $p[-1][-1]$, and the upper neighboring samples may be $p[0][-1]$ to $p[2N-1][-1]$.

For example, when the neighboring sample $p[-1][2N-1]$ is unavailable, a search may be sequentially performed from the neighboring sample $p[-1][2N-1]$ (or neighboring sample $p[-1][2N-2]$) to $p[-1][-1]$ and then from $p[0][-1]$ to $p[2N-1][-1]$, and the value of an available neighboring sample first found is assigned to the neighboring sample $p[-1][2N-1]$. In addition, a search may be sequentially performed from where $x=-1$ and $y=2N-2$ to where $x=-1$ and $y=-1$. When $p[x][y]$ is unavailable, the value of $p[x][y+1]$ may replace the value of unavailable $p[x][y]$. Further, a search may be sequentially performed from where $x=0$ and $y=-1$ to where $x=2N-1$ and $y=-1$. When $[x][y]$ is unavailable, the value of $p[x-1][y]$ may replace the value of unavailable $p[x][y]$.

The encoding device may derive second neighboring samples including right neighboring samples, a lower-right neighboring samples, and lower neighboring samples of the current block based on the first neighboring samples. When the current block has a sample size of N×N and the position of the top-left sample of the current block has an x component of 0 and a y component of 0, the lower neighboring samples may be $p[0][N]$ to $p[N-1][N]$, the lower-right neighboring sample may be $p[N][N]$, and the right neighboring samples may be $p[N][N-1]$ to $p[N][0]$.

For example, the encoding device may derive the lower-right neighboring sample based on the neighboring sample $p[-1][N]$ and the neighboring sample $p[N][-1]$ among the first neighboring samples. Specifically, for example, the encoding device may derive the lower-right neighboring sample through interpolation of the neighboring sample $p[-1][N]$ and the neighboring sample $p[N][-1]$. Also, for example, the encoding device may derive the lower-right neighboring sample through the average of the neighboring sample p[−1][N] and the neighboring sample p[N][−1]. Further, for example, the encoding device may derive the lower-right neighboring sample from the neighboring sample p[−1] [N] and the neighboring sample p[N][−1] based on Equation 2.

In another example, the encoding device may derive the lower-right neighboring sample based on the neighboring sample p[−1][2N−1] and the neighboring sample p[2N−1][−1] among the first neighboring samples. Specifically, for example, the encoding device may derive the lower-right neighboring sample through interpolation of the neighboring sample p[−1][2N−1] and the neighboring sample p[2N−1][−1]. Further, for example, the encoding device may derive the lower-right neighboring sample through the average of the neighboring sample p[−1][2N−1] and the neighboring sample p[2N−1][−1]. Further, for example, the encoding device may derive the lower-right neighboring samples from the neighboring sample p[−1] [2N−1] and the neighboring sample p[2N−1][−1] based on Equation 3.

When the lower-right neighboring sample of the current block is derived, the encoding device may derive the lower neighboring samples of the current block based on the first neighboring samples and the lower-right neighboring sample. For example, the encoding device may derive the sample values of the lower neighboring samples through interpolation of the lower-right neighboring sample and the neighboring sample p[−1][N] among the first neighboring samples. Further, the encoding device may derive the right neighboring samples of the current block based on the first neighboring samples and the lower-right neighboring sample. For example, the encoding device may derive the right neighboring samples through interpolation of the lower-right neighboring sample and the neighboring sample p[N][−1] among the first neighboring samples.

Next, the encoding device may derive a prediction sample of the current block based on a first reference sample positioned in the prediction direction of the intra-prediction mode among the first neighboring samples and the second neighboring samples and a second reference sample positioned in the opposite direction of the prediction direction. For example, the encoding device may derive the prediction sample of the current block through interpolation of the first reference sample and the second reference sample. Further, for example, the encoding device may derive the prediction sample from the first reference sample and the second reference sample based on Equation 1.

The encoding device may reconstruct the current block based on the prediction sample. The encoding device may generate a residual sample for the current block and may reconstruct the current block based on the prediction sample and the residual sample.

The reconstruction order of the plurality of TUs positioned in the area of the current PU may be determined based on the intra-prediction mode for the current PU. The intra-prediction mode for the current PU may be, for example, one of intra-prediction modes 0 to 34, wherein intra-prediction modes 0 and 1 may be non-directional intra-prediction modes and intra-prediction modes 2 to 34 may be directional intra-prediction modes.

For example, the directional intra-prediction modes may be divided into a plurality of categories, and the reconstruction order of the plurality of TUs may be determined according to which category of the plurality of categories the intra-prediction mode for the current PU belongs to. Here, for example, the plurality of categories may include category 1, category 2, and category 3. Intra-prediction modes 2 to 9 may belong to category 1, intra-prediction modes 10 to 26 may belong to category 2, and intra-prediction modes 27 to 34 may belong to category 3. The non-directional intra-prediction modes may not belong to the plurality of categories or may belong to the category 2.

When the intra-prediction modes are divided into the plurality of categories and the intra-prediction mode for the current PU belongs to category 1, the reconstruction order of the plurality of TUs may be determined to be, for example, a horizontally inverted raster scan order. In addition, when the intra-prediction mode for the current PU belongs to category 2, the reconstruction order of the plurality of TUs may be determined to be, for example, a raster scan order. Further, when the intra-prediction mode for the current PU belongs to category 3, the reconstruction order of the plurality of TUs may be determined to be, for example, a vertically inversed raster scan order.

In another example, when the intra-prediction mode for the current PU is one of intra-prediction modes 2 to 9, the plurality of TUs may be sequentially reconstructed in order from a lower row to an upper row and may be sequentially reconstructed in order from a left TU to a right TU in each row. When the intra-prediction mode for the current PU is one of intra-prediction modes 27 to 34, the plurality of TUs may be sequentially reconstructed in order from an upper row to a lower row and may be sequentially reconstructed in order from a right TU to a left TU in each row. When the intra-prediction mode for the current PU is one of intra-prediction modes 10 to 26, the plurality of TUs may be sequentially reconstructed in order from an upper row to a lower row and may be sequentially reconstructed in order from a left TU to a right TU in each row.

The plurality of TUs may be derived as square TUs or non-square TUs from a current CU based on the intra-prediction mode for the current PU.

For example, when the intra-prediction mode for the current PU is one of intra-prediction modes 18 to 34, the plurality of TUs may be derived as non-square TUs having a width longer than a height. Specifically, for example, when the current CU has a size of 2N×2N, the plurality of TUs may be derived as 2N×N non-square TUs. Also, the plurality of TUs may be derived as 2N×nU non-square TUs. In addition, the plurality of TUs may be derived as 2N×nD non-square TUs. Further, the plurality of TUs may be derived as 2N×nN non-square TUs. For example, each of the plurality of TUs may be derived as a non-square TU with a 2N×N/2 size.

In another example, when the intra-prediction mode for the current PU is one of intra-prediction modes 2 to 17, the plurality of TUs may be derived as non-square TUs having a height longer than a width. Specifically, for example, when the current CU has a size of 2N×2N, the plurality of TUs may be derived as N×2N non-square TUs. Further, the plurality of TUs may be derived as nL×2N non-square TUs. In addition, the plurality of TUs may be derived as nR×2N non-square TUs. Also, the plurality of TUs may be derived as nN×2N non-square TUs. For example, each of the plurality of TUs may be derived as a non-square TU with an N/2×2N size.

The encoding device encodes and outputs information on the intra-prediction mode for the current PU (S1320). The encoding device may encode the information on the intra-prediction mode for the current PU and may output the information in a bitstream form. The encoding device may generate and encode the information on the intra-prediction mode indicating the intra-prediction mode and may output the information in a bitstream form. The information on the intra-prediction mode may include information directly indicating the intra-prediction mode for the current PU or information indicating any one candidate on an intra-prediction mode candidate list derived based on an intra-prediction mode for a left or upper block of the current PU.

Although not shown in the drawing, the encoding device may generate residual information on the current block, may encode the residual information, and may output the residual information in a bitstream form. The residual information may include transform coefficients related to a residual sample for the current block. The bitstream may be transmitted to a decoding device via a network or a storage medium.

Figure 14:
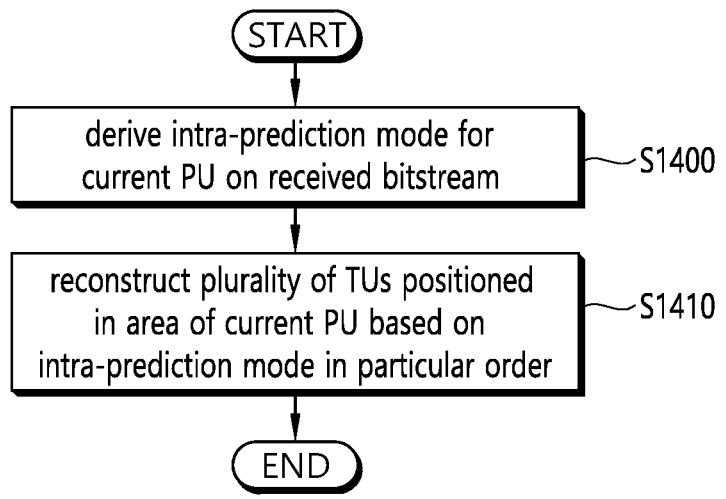
FIG. 14 schematically illustrates a video decoding method by a decoding device according to the present invention.

FIG. 14 schematically illustrates a video decoding method by a decoding device according to the present invention. The method illustrated in FIG. 14 may be performed by the decoding device illustrated in FIG. 2. Specifically, for example, S1400 and S1410 may be performed by the predictor of the decoding device.

The decoding device derives an intra-prediction mode for a current PU based on a received bitstream (S1400). The decoding device may obtain information on the intra-prediction mode for the current PU through the bitstream. The decoding device may derive the intra-prediction mode for the current PU based on the information on the intra-prediction mode. The information on the intra-prediction mode may include information directly indicating the intra-prediction mode for the current PU or information indicating any one candidate on an intra-prediction mode candidate list derived based on an intra-prediction mode for a left or upper block of the current PU. The intra-prediction mode for the current PU may be, for example, one of intra-prediction modes 0 to 34, wherein intra-prediction modes 0 and 1 may be non-directional intra-prediction modes and intra-prediction modes 2 to 34 may be directional intra-prediction modes. As described above, the two non-directional prediction modes may include an intra DC mode and an intra planar mode.

A current block may be one of a plurality of TUs positioned in the area of the current PU, and the intra-prediction mode for the current PU may be derived as an intra-prediction mode for the current block.

The decoding device reconstructs the plurality of TUs positioned in the area of the current PU based on the intra-prediction mode (S1410). The decoding device may perform intra-prediction on each of the plurality of TUs to generate a prediction sample and may reconstruct each TU based on the prediction sample.

For example, the decoding device may derive first neighboring samples including left neighboring samples, an upper-left neighboring sample, and right neighboring samples of the current block, which is one of the plurality of TUs. The first neighboring samples may be samples already reconstructed.

When there is an unavailable sample among the first neighboring samples (p[−1][2N−1], . . . , p[−1][−1], p[2N−1][−1]), the unavailable sample may be replaced with an available sample through a substitution or padding procedure. In this case, for example, the unavailable sample may be substituted or padded with another neighboring sample adjacent to the sample. When the current block has a size of N×N and the position of a top-left sample of the current block has an x component of 0 and a y component of 0, the left neighboring samples may be p[−1][2N−1] to p[−1][0], the upper-left neighboring sample may be p[−1][−1], and the upper neighboring samples may be p[0][−1] to p[2N−1][−1].

For example, when the neighboring sample p[−1][2N−1] is unavailable, a search may be sequentially performed from the neighboring sample p[−1][2N−1] (or neighboring sample p[−1][2N−2]) to p[−1][−1] and then from p[0][−1] to p[2N−1][−1], and the value of an available neighboring sample first found is assigned to the neighboring sample p[−1][2N−1]. In addition, a search may be sequentially performed from where x=−1 and y=2N−2 to where x=−1 and y=−1. When p[x][y] is unavailable, the value of p[x][y+1] may replace the value of unavailable p[x][y]. Further, a search may be sequentially performed from where x=0 and y=−1 to where x=2N−1 and y=−1. When [x][y] is unavailable, the value of p[x−1][y] may replace the value of unavailable p[x][y].

The decoding device may derive second neighboring samples including right neighboring samples, a lower-right neighboring samples, and lower neighboring samples of the current block based on the first neighboring samples. When the current block has a sample size of N×N and the position of the top-left sample of the current block has an x component of 0 and a y component of 0, the lower neighboring samples may be p[0][N] to p[N−1][N], the lower-right neighboring sample may be p[N][N], and the right neighboring samples may be p[N][N−1] to p[N][0].

For example, the decoding device may derive the lower-right neighboring sample based on the neighboring sample p[−1][N] and the neighboring sample p[N][−1] among the first neighboring samples. Specifically, for example, the decoding device may derive the lower-right neighboring sample through interpolation of the neighboring sample p[−1][N] and the neighboring sample p[N][−1]. Also, for example, the decoding device may derive the lower-right neighboring sample through the average of the neighboring sample p[−1][N] and the neighboring sample p[N][−1]. Further, for example, the decoding device may derive the lower-right neighboring sample from the neighboring sample p[−1] [N] and the neighboring sample p[N][−1] based on Equation 2.

In another example, the decoding device may derive the lower-right neighboring sample based on the neighboring sample p[−1][2N−1] and the neighboring sample p[2N−1][−1] among the first neighboring samples. Specifically, for example, the decoding device may derive the lower-right neighboring sample through interpolation of the neighboring sample p[−1][2N−1] and the neighboring sample p[2N−1][−1]. Further, for example, the decoding device may derive the lower-right neighboring sample through the average of the neighboring sample p[−1][2N−1] and the neighboring sample p[2N−1][−1]. Further, for example, the decoding device may derive the lower-right neighboring samples from the neighboring sample p[−1][2N−1] and the neighboring sample p[2N−1][−1] based on Equation 3.

When the lower-right neighboring sample of the current block is derived, the decoding device may derive the lower neighboring samples of the current block based on the first neighboring samples and the lower-right neighboring sample. For example, the decoding device may derive the sample values of the lower neighboring samples through interpolation of the lower-right neighboring sample and the neighboring sample p[−1][N] among the first neighboring samples. Further, the decoding device may derive the right neighboring samples of the current block based on the first neighboring samples and the lower-right neighboring sample. For example, the decoding device may derive the right neighboring samples through interpolation of the lower-right neighboring sample and the neighboring sample p[N][−1] among the first neighboring samples.

Next, the decoding device may derive a prediction sample of the current block based on a first reference sample positioned in the prediction direction of the intra-prediction mode among the first neighboring samples and the second neighboring samples and a second reference sample positioned in the opposite direction of the prediction direction. For example, the decoding device may derive the prediction sample of the current block through interpolation of the first reference sample and the second reference sample. Further, for example, the decoding device may derive the prediction sample from the first reference sample and the second reference sample based on Equation 1.

The decoding device may reconstruct the current block based on the prediction sample. The decoding device may receive residual information on the current block from the bitstream. The residual information may include transform coefficients related to a residual sample for the current block.

The decoding device may derive the residual sample (or residual sample array) for the current block based on the residual information. The decoding device may generate a reconstruction sample based on the prediction sample and the residual sample and may derive a reconstruction block or a reconstruction picture based on the reconstruction sample. Subsequently, as described above, the decoding device may apply an in-loop filtering procedure, such as deblocking filtering and/or SAO procedures, to the reconstruction picture in order to improve subjective/objective image picture quality as necessary.

The reconstruction order of the plurality of TUs positioned in the area of the current PU may be determined based on the intra-prediction mode for the current PU. The intra-prediction mode for the current PU may be one of intra-prediction modes 0 to 34, wherein intra-prediction modes 0 and 1 may be non-directional intra-prediction modes and intra-prediction modes 2 to 34 may be directional intra-prediction modes.

For example, the directional intra-prediction modes may be divided into a plurality of categories, and the reconstruction order of the plurality of TUs may be determined according to which category of the plurality of categories the intra-prediction mode for the current PU belongs to. Here, for example, the plurality of categories may include category 1, category 2, and category 3. Intra-prediction modes 2 to 9 may belong to category 1, intra-prediction modes 10 to 26 may belong to category 2, and intra-prediction modes 27 to 34 may belong to category 3. The non-directional intra-prediction modes may not belong to the plurality of categories or may belong to the category 2.

When the intra-prediction modes are divided into the plurality of categories and the intra-prediction mode for the current PU belongs to category 1, the reconstruction order of the plurality of TUs may be determined to be a horizontally inverted raster scan order. In addition, when the intra-prediction mode for the current PU belongs to category 2, the reconstruction order of the plurality of TUs may be determined to be a raster scan order. Further, when the intra-prediction mode for the current PU belongs to category 3, the reconstruction order of the plurality of TUs may be determined to be a vertically inversed raster scan order.

In another example, when the intra-prediction mode for the current PU is one of intra-prediction modes 2 to 9, the plurality of TUs may be sequentially reconstructed in order from a lower row to an upper row and may be sequentially reconstructed in order from a left TU to a right TU in each row. When the intra-prediction mode for the current PU is one of intra-prediction modes 27 to 34, the plurality of TUs may be sequentially reconstructed in order from an upper row to a lower row and may be sequentially reconstructed in order from a right TU to a left TU in each row. When the intra-prediction mode for the current PU is one of intra-prediction modes 10 to 26, the plurality of TUs may be sequentially reconstructed in order from an upper row to a lower row and may be sequentially reconstructed in order from a left TU to a right TU in each row.

The plurality of TUs may be derived as square TUs or non-square TUs from a current CU based on the intra-prediction mode for the current PU.

For example, when the intra-prediction mode for the current PU is one of intra-prediction modes 18 to 34, the plurality of TUs may be derived as non-square TUs having a width longer than a height. Specifically, for example, when the current CU has a size of 2N×2N, the plurality of TUs may be derived as 2N×N non-square TUs. Also, the plurality of TUs may be derived as 2N×nU non-square TUs. In addition, the plurality of TUs may be derived as 2N×nD non-square TUs. Further, the plurality of TUs may be derived as 2N×nN non-square TUs. For example, each of the plurality of TUs may be derived as a non-square TU with a 2N×N/2 size.

In another example, when the intra-prediction mode for the current PU is one of intra-prediction modes 2 to 17, the plurality of TUs may be derived as non-square TUs having a height longer than a width. Specifically, for example, when the current CU has a size of 2N×2N, the plurality of TUs may be derived as N×2N non-square TUs. Further, the plurality of TUs may be derived as nL×2N non-square TUs. In addition, the plurality of TUs may be derived as nR×2N non-square TUs. Also, the plurality of TUs may be derived as nN×2N non-square TUs. For example, each of the plurality of TUs may be derived as a non-square TU with an N/2×2N size. According to the present invention described above, intra-prediction may be performed based on first neighboring samples and second neighboring samples of a current block, thereby improving the accuracy of intra-prediction on the current block.

Further, according to the present invention, the reconstruction order of a plurality of TUs positioned in the area of a current PU may be changed based on an intra-prediction mode for the current PU, thereby improving the accuracy of intra-prediction on the current block.

Also, according to the present invention, non-square TUs may be derived from a current CU, thereby improving the accuracy of intra-prediction on the current block.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A video decoding method performed by a decoding device, the method comprising:
deriving an intra-prediction mode for a current prediction unit (PU) based on a received bitstream; and
reconstructing a plurality of transform units (TUs) positioned in an area of the current PU based on the intra-prediction mode,
wherein the reconstructing comprises:
deriving first neighboring samples comprising left neighboring samples, an upper-left neighboring sample, and right neighboring samples of a current block, which is one of the plurality of TUs;
deriving second neighboring samples comprising right neighboring samples, a lower-right neighboring samples, and lower neighboring samples of the current block based on the first neighboring samples;
deriving a prediction sample of the current block based on a first reference sample positioned in a prediction direction of the intra-prediction mode among the first neighboring samples and the second neighboring samples and a second reference sample positioned in an opposite direction of the prediction direction; and
reconstructing the current block based on the prediction sample,
wherein the prediction sample of the current block is derived based on an equation illustrated below:

predSample=($d1$*predSample0+$d0$predSample1+(($d1$+$d0$)>>1))/($d1$+$d0$), where predSample denotes the prediction sample of the current block, predSample0 denotes the first reference sample, predSample1 denotes the second reference sample, d0 denotes a distance between the prediction sample and the first reference sample, and d1 denotes a distance between the prediction sample and the second reference sample.

2. The method of claim 1, wherein when the current block has a sample size of N×N and a position of a top-left sample of the current block has an x component of 0 and a y component of 0, the lower-right neighboring sample is derived through interpolation of a neighboring sample p[−1][N] and a neighboring sample p[N][−1].

3. The method of claim 1, wherein the plurality of TUs positioned in the area of the current PU is sequentially reconstructed, and a reconstruction order of the plurality of TUs is determined based on the intra-prediction mode for the current PU.

4. The method of claim 3, wherein the intra-prediction mode for the current PU is one of intra-prediction modes 0 to 34, among which intra-prediction modes 0 and 1 are non-directional intra-prediction modes and intra-prediction modes 2 to 34 are directional intra-prediction modes,
the directional intra-prediction modes are divided into a plurality of categories, and
the reconstruction order of the plurality of TUs is determined according to which category of the plurality of categories the intra-prediction mode for the current PU belongs to.

5. The method of claim 4, wherein the plurality of categories comprises category 1, category 2, and category 3,
the reconstruction order of the plurality of TUs is determined to be a horizontally inverted raster scan order when the intra-prediction mode for the current PU belongs to category 1,
the reconstruction order of the plurality of TUs is determined to be a raster scan order when the intra-prediction mode for the current PU belongs to category 2, and
the reconstruction order of the plurality of TUs is determined to be a vertically inversed raster scan order when the intra-prediction mode for the current PU belongs to category 3.

6. The method of claim 3, wherein the intra-prediction mode for the current PU is one of intra-prediction modes 0 to 34, among which intra-prediction modes 0 and 1 are non-directional intra-prediction modes and intra-prediction modes 2 to 34 are directional intra-prediction modes, and
when the intra-prediction mode for the current PU is one of intra-prediction modes 2 to 9,
the plurality of TUs is sequentially reconstructed in order from a lower row to an upper row and is sequentially reconstructed in order from a left TU to a right TU in each row.

7. The method of claim 3, wherein the intra-prediction mode for the current PU is one of intra-prediction modes 0 to 34, among which intra-prediction modes 0 and 1 are non-directional intra-prediction modes and intra-prediction modes 2 to 34 are directional intra-prediction modes, and
when the intra-prediction mode for the current PU is one of intra-prediction modes 27 to 34,
the plurality of TUs is sequentially reconstructed in order from an upper row to a lower row and is sequentially reconstructed in order from a right TU to a left TU in each row.

8. The method of claim 1, wherein the plurality of TUs is derived from a current coding unit (CU), and
when the intra-prediction mode is one of intra-prediction modes 2 to 17, the plurality of TUs is derived as non-square TUs having a height longer than a width.

9. The method of claim 8, wherein when the current CU has a size of 2N×2N, the plurality of TUs is derived as N×2N non-square TUs.

10. The method of claim 8, wherein when the current CU has a size of 2N×2N, the plurality of TUs is derived as nL×2N or mR×2N non-square TUs.

11. The method of claim 1, wherein the plurality of TUs is derived from a current coding unit (CU), and
when the intra-prediction mode is one of intra-prediction modes 18 to 34, the plurality of TUs is derived as non-square TUs having a width longer than a height.

12. The method of claim 9, wherein when the current CU has a size of 2N×2N, the plurality of TUs is derived as 2N×N non-square TUs.

13. A decoding device for performing a video decoding method, the device comprising:
an entropy decoder configured to obtain intra-prediction mode information on a current prediction unit (PU) based on a received bitstream; and
a predictor configured to derive an intra-prediction mode for the current P based on the intra-prediction mode information and to reconstruct a plurality of transform units (TUs) positioned in an area of the current PU based on the intra-prediction mode,
wherein the predictor derives first neighboring samples comprising left neighboring samples, an upper-left neighboring sample, and right neighboring samples of a current block, which is one of the plurality of TUs, derives second neighboring samples comprising right neighboring samples, a lower-right neighboring samples, and lower neighboring samples of the current block based on the first neighboring samples, derives a prediction sample of the current block based on a first reference sample positioned in a prediction direction of the intra-prediction mode among the first neighboring samples and the second neighboring samples and a second reference sample positioned in an opposite direction of the prediction direction, and reconstructs the current block based on the prediction sample, and wherein the prediction sample of the current block is derived based on an equation illustrated below:

$$predSample=(d1*predSample0+d0predSample1+((d1+d0)>>1))/(d1+d0),$$

where predSample denotes the prediction sample of the current block, predSample0 denotes the first reference sample, predSample1 denotes the second reference sample, d0 denotes a distance between the prediction sample and the first reference sample, and d1 denotes a distance between the prediction sample and the second reference sample.

* * * * *